(12) United States Patent
Dimig et al.

(10) Patent No.: US 9,457,833 B2
(45) Date of Patent: Oct. 4, 2016

(54) STEERING LOCK

(71) Applicant: STRATTEC Security Corporation, Milwaukee, WI (US)

(72) Inventors: Steven J. Dimig, Plymouth, WI (US); Jon W. Behrens, Brookfield, WI (US); Michael D. Fink, Milwaukee, WI (US)

(73) Assignee: STRATTEC SECURITY CORPORATION, Milwaukee, WI (US)

( * ) Notice: Subject to any disclaimer, the term of this patent is extended or adjusted under 35 U.S.C. 154(b) by 0 days.

(21) Appl. No.: 14/480,060

(22) Filed: Sep. 8, 2014

(65) Prior Publication Data

US 2014/0373665 A1    Dec. 25, 2014

Related U.S. Application Data

(63) Continuation of application No. 14/018,549, filed on Sep. 5, 2013, now abandoned, and a continuation-in-part of application No. 13/574,997, filed as application No. PCT/US2011/022586 on Jan.

(Continued)

(51) Int. Cl.
*B60R 25/021* (2013.01)
*B62D 1/184* (2006.01)
(Continued)

(52) U.S. Cl.
CPC ........... *B62D 1/184* (2013.01); *B60R 25/0211* (2013.01); *B60R 25/0215* (2013.01); *B62D 1/16* (2013.01)

(58) Field of Classification Search
CPC ............ B60R 25/02153; B60R 25/02; B60R 25/021; B60R 25/02147; B60R 25/02113; B60R 25/007; B60R 25/02107; B60R 25/02126; B60R 25/0211; B60R 25/0215; B62D 1/184
See application file for complete search history.

(56) References Cited

U.S. PATENT DOCUMENTS 1,592,087 A    7/1962  Fairchild
3,638,462 A    2/1972  White et al.
(Continued)

FOREIGN PATENT DOCUMENTS

CN    101234628 A    8/2008
DE    3611483    9/1987
(Continued)

OTHER PUBLICATIONS

Thierry Touratier, Steering column antitheft device provided with locking pin blocking means, Feb. 2, 2002, EPO, EP 1 167 135 A1, English Abstract.*

(Continued)

*Primary Examiner* — James English
(74) *Attorney, Agent, or Firm* — Michael Best & Friedrich LLP

(57) ABSTRACT

A steering lock for inhibiting rotation of a rotary steering member having a rib. A lockbolt is movable along a first axis between steering member-locking and -unlocking positions. A shuttle moves between a non-blocking position, in which the shuttle does not obstruct movement of the lockbolt from the steering member-locking position, and a blocking position, in which the shuttle obstructs movement of the lockbolt out of the steering member-locking position. An actuator is coupled to the shuttle and operable to drive the lockbolt to the steering member-locking position by moving the shuttle from the non-blocking position to the blocking position. The lockbolt is unbiased along the first axis.

30 Claims, 29 Drawing Sheets

Related U.S. Application Data 26, 2011, now abandoned, which is a continuation-in-part of application No. 12/694,584, filed on Jan. 27, 2010, now Pat. No. 8,424,348.

(60) Provisional application No. 61/698,197, filed on Sep. 7, 2012, provisional application No. 61/810,444, filed on Apr. 10, 2013.

(51) Int. Cl.
*B62D 1/16* (2006.01)
*B60R 25/0215* (2013.01)

(56) References Cited

U.S. PATENT DOCUMENTS

| | | | |
|---|---|---|---|
| 3,859,828 A | 1/1975 | Ibuka et al. |
| 4,232,537 A | 11/1980 | Plaiss |
| 4,576,024 A | 3/1986 | Weber |
| 4,638,882 A | 1/1987 | Sato |
| 4,643,009 A | 2/1987 | Sato |
| 4,773,241 A | 9/1988 | Peitsmeier et al. |
| 4,776,189 A | 10/1988 | Weber et al. |
| 5,133,106 A | 7/1992 | Milbredt et al. |
| 5,896,765 A | 4/1999 | Peyre et al. |
| 6,125,671 A | 10/2000 | Suzuki |
| 6,233,986 B1 | 5/2001 | Suzuki et al. |
| 6,295,848 B1 | 10/2001 | Suzuki |
| 6,298,938 B1 | 10/2001 | Klaiber et al. |
| 6,354,118 B1 | 3/2002 | Frick et al. |
| 6,400,041 B1 | 6/2002 | Engelmann et al. |
| 6,439,011 B1 | 8/2002 | Frick et al. |
| 6,539,756 B2 | 4/2003 | Bartels et al. |
| 6,543,262 B2 | 4/2003 | Limburg et al. |
| 6,571,587 B2 | 6/2003 | Dimig et al. |
| 6,647,751 B2 | 11/2003 | Zillmann |
| 6,718,805 B2 | 4/2004 | Okuno |
| 6,748,774 B2 | 6/2004 | Dubay et al. |
| 6,755,058 B2 | 6/2004 | Zillmann |
| 6,776,251 B2 | 8/2004 | Landmann |
| 6,810,702 B2 | 11/2004 | Fuchs et al. |
| 6,810,763 B1 | 11/2004 | Frick et al. |
| 6,862,907 B2 | 3/2005 | Hayashi et al. |
| 6,915,671 B2 | 7/2005 | Zillmann |
| 6,931,896 B2 | 8/2005 | Ochi |
| 6,941,781 B2 | 9/2005 | Fukushima |
| 6,952,059 B1 | 10/2005 | Louvel et al. |
| 7,007,525 B2 | 3/2006 | Okuno et al. |
| 7,021,093 B2 | 4/2006 | Fukatsu et al. |
| 7,055,351 B2 | 6/2006 | Suzuki et al. |
| 7,086,256 B2 | 8/2006 | Hasegawa |
| 7,098,554 B2 | 8/2006 | Hayashi et al. |
| 7,104,097 B2 | 9/2006 | Zillmann |
| 7,121,126 B2 | 10/2006 | Zillmann |
| 7,140,213 B2 | 11/2006 | Feucht et al. |
| 7,161,262 B2 | 1/2007 | Nagae et al. |
| 7,187,089 B2 | 3/2007 | Fukano et al. |
| 7,204,516 B2 | 4/2007 | Schneider et al. |
| 7,234,328 B2 | 6/2007 | Okuno et al. |
| 7,251,968 B2 | 8/2007 | Hasegawa |
| 7,260,963 B2 | 8/2007 | Suzuki et al. |
| 7,310,979 B2 | 12/2007 | Hasegawa |
| 7,328,596 B2 | 2/2008 | Hasegawa et al. |
| 7,362,006 B2 | 4/2008 | Otani et al. |
| 7,363,785 B2 | 4/2008 | Limburg et al. |
| 7,596,976 B2 | 10/2009 | Sugimoto |
| 7,604,254 B2 | 10/2009 | Pieronczyk et al. |
| 7,703,309 B2 | 4/2010 | Okuno et al. |
| 7,714,459 B2 | 5/2010 | Hirche et al. |
| 7,762,110 B2 | 7/2010 | Tsukazaki |
| 7,810,363 B2 | 10/2010 | Okada et al. |
| 7,823,426 B2 | 11/2010 | Okuno et al. |
| 7,870,768 B2 | 1/2011 | Tanioka et al. |
| 7,921,684 B2 | 4/2011 | Okuno et al. |
| 8,001,814 B2 | 8/2011 | Okada et al. |
| 8,006,526 B2 | 8/2011 | Fort et al. |
| 8,047,028 B2 | 11/2011 | Farmer et al. |
| 8,240,176 B2 | 8/2012 | Okada |
| 8,256,252 B2 | 9/2012 | Okada |
| 8,272,239 B2 * | 9/2012 | Fong ................ B60R 25/02 70/185 |
| 8,424,348 B2 | 4/2013 | Dimig et al. |
| 8,561,442 B2 | 10/2013 | Farmer et al. |
| 2002/0088257 A1* | 7/2002 | Dimig ............... B60R 25/02153 70/186 |
| 2004/0069027 A1* | 4/2004 | Fukushima ....... B60R 25/02153 70/186 |
| 2004/0107750 A1* | 6/2004 | Fukushima ....... B60R 25/02153 70/186 |
| 2005/0183476 A1 | 8/2005 | Feucht et al. |
| 2006/0005588 A1 | 1/2006 | Okuno |
| 2006/0021399 A1 | 2/2006 | Hasegawa |
| 2006/0081023 A1* | 4/2006 | Tanimoto .......... B60R 25/02105 70/186 |
| 2006/0169010 A1 | 8/2006 | Limburg |
| 2006/0169011 A1 | 8/2006 | Limburg |
| 2007/0113604 A1* | 5/2007 | Khoury ............. B60R 25/02153 70/186 |
| 2008/0047309 A1 | 2/2008 | Okuno et al. |
| 2008/0178643 A1* | 7/2008 | Okuno ............. B60R 25/02153 70/184 |
| 2008/0202275 A1 | 8/2008 | Rouleau et al. |
| 2009/0007612 A1 | 1/2009 | Laval et al. |
| 2009/0064739 A1 | 3/2009 | Trischberger et al. |
| 2009/0084145 A1 | 4/2009 | Sugimoto |
| 2009/0165510 A1* | 7/2009 | Sugimoto ......... B60R 25/02153 70/253 |
| 2009/0266195 A1 | 10/2009 | Tanke et al. |
| 2010/0018265 A1 | 1/2010 | Kumano |
| 2010/0206020 A1* | 8/2010 | Chen ............... B60R 25/02153 70/210 |
| 2010/0212377 A1 | 8/2010 | Graglia |
| 2011/0132048 A1 | 6/2011 | Okada |
| 2011/0167885 A1 | 7/2011 | Sugimoto |
| 2011/0179836 A1* | 7/2011 | Dimig .................. B60R 25/00 70/182 |
| 2014/0069155 A1* | 3/2014 | Laval ................ B60R 25/0215 70/183 |
| 2014/0124282 A1* | 5/2014 | Laval ............. B60R 25/02153 180/287 |

FOREIGN PATENT DOCUMENTS

| | | | |
|---|---|---|---|
| DE | 19522508 | 6/1996 |
| DE | 19650751 | 11/1997 |
| DE | 10017032 | 10/2001 |
| DE | 10041984 | 4/2002 |
| DE | 102005030783 | 3/2006 |
| DE | 102005050920 | 5/2007 |
| DE | 102006059282 | 6/2008 |
| DE | 112011100350 | 12/2012 |
| EP | 0240724 | 5/1989 |
| EP | 0669234 | 11/1997 |
| EP | 1174314 | 1/2002 |
| EP | 1182104 | 2/2002 |
| EP | 1176065 | 7/2004 |
| EP | 1447286 | 8/2004 |
| EP | 1182103 | 4/2005 |
| EP | 1477378 | 9/2005 |
| EP | 1953049 | 8/2008 |
| EP | 2070781 | 2/2011 |
| EP | 2262670 | 11/2011 |
| FR | 1167135 A1 * | 1/2002 | ....... B60R 25/02115 |
| GB | 331611 | 7/1930 |
| GB | 1541388 | 2/1979 |
| GB | 2057555 | 4/1981 |
| GB | 2346354 | 8/2000 |
| WO | 02090152 | 11/2002 |
| WO | 2007127962 | 11/2007 |

OTHER PUBLICATIONS

Thierry Touratier, Steering column antitheft device provided with locking pin blocking means, Feb. 2, 2002, EPO, EP 1 167 135 A1, Machine Translation of Description.*

(56) References Cited

OTHER PUBLICATIONS

International Search Report and Written Opinion for Application No. PCT/US2011/022586 dated Apr. 21, 2011 (8 pages).
International Preliminary Report on Patentability for Application No. PCT/US2011/22586 dated Dec. 17, 2012 (5 pages).
Office Action from the United States Patent and Trademark Office for U.S. Appl. No. 13/574,997 dated Mar. 21, 2014 (8 pages).
First Office Action with English translation from the State Intellectual Property Office of the People's Republic of China for Application No. 201180013886.8 dated Sep. 12, 2014 (14 pages).

* cited by examiner

STEERING LOCK

CROSS-REFERENCE TO RELATED APPLICATIONS

This application is a continuation of U.S. patent application Ser. No. 14/018,549, filed Sep. 5, 2013, which claims priority to both U.S. Provisional Patent Application No. 61/698,197 filed Sep. 7, 2012 and U.S. Provisional Patent Application No. 61/810,444 filed Apr. 10, 2013, the entire contents of all of which are incorporated by reference herein. This application also claims priority as continuation-in-part to U.S. patent application Ser. No. 13/574,997, filed Jul. 24, 2012, which is a national phase filing under 35 U.S.C. 371 of PCT/US2011/022586, filed Jan. 26, 2011, which claims priority as continuation-in-part to U.S. patent application Ser. No. 12/694,584, filed Jan. 27, 2010, which issued as U.S. Pat. No. 8,424,348 on Apr. 23, 2013, the entire contents of all of which are incorporated by reference herein.

BACKGROUND

The present invention relates to locking mechanisms for locking (i.e., preventing unauthorized rotation of) a rotary steering member such as a steering wheel, handlebar, etc. of a vehicle.

Conventional steering column locks use an actuator mechanism to drive a locking pin into and out of locking engagement with a steering shaft. Efficient transfer of motion can be accomplished by directly driving the locking pin back and forth. However, certain circumstances may arise in which the locking pin becomes substantially wedged against one of the recesses in the steering shaft. In order to account for this occurrence, the electric motor that drives the locking pin and the corresponding electric drive circuit for the motor must have current/power ratings substantially higher than what is required for normal operation (when the locking pin is not wedged). Also, complex gear reduction devices may be implemented in order to multiply the torque output of the motor. In either case, the locking device as a whole becomes more costly and complicated, and may generate excessive noise.

SUMMARY

In one construction, the invention provides a steering lock for selectively inhibiting rotation of a rotary steering member having a rib. The steering lock includes a lockbolt movable along a first axis between a steering member-locking position, in which a distal tip of the lockbolt is positioned in interference with the rib, and a steering member-unlocking position, in which the distal tip of the lockbolt is positioned out of interference with the rib. A shuttle is movable between a non-blocking position, in which the shuttle does not obstruct movement of the lockbolt from the steering member-locking position to the steering member-unlocking position, and a blocking position, in which the shuttle obstructs movement of the lockbolt out of the steering member-locking position. An actuator is coupled to the shuttle and operable to drive the lockbolt to the steering member-locking position by moving the shuttle from the non-blocking position to the blocking position. A lost motion connection is provided between the actuator and the lockbolt. Motive force from the actuator is transmitted through the lost motion connection to drive the lockbolt to the steering member-locking position when the rib is not aligned with the first axis, and motive force from the actuator is taken up by the lost motion connection when the rib is aligned with the first axis.

In another construction, the invention provides a steering lock for selectively inhibiting rotation of a rotary steering member having a rib. The steering lock includes a lockbolt movable along a first axis between a steering member-locking position, in which a distal tip of the lockbolt is positioned in interference with the rib, and a steering member-unlocking position, in which the distal tip of the lockbolt is positioned out of interference with the rib. A shuttle is movable between a non-blocking position, in which the shuttle does not obstruct movement of the lockbolt from the steering member-locking position to the steering member-unlocking position, and a blocking position, in which the shuttle obstructs movement of the lockbolt out of the steering member-locking position. An actuator is coupled to the shuttle and operable to drive the lockbolt to the steering member-locking position by moving the shuttle from the non-blocking position to the blocking position. A lost motion connection is provided between the actuator and the lockbolt. The lost motion connection is configured to store energy supplied from the actuator when the shuttle from the non-blocking position to the blocking position while the rib is aligned with the first axis. The lockbolt is movable to the steering member-locking position by the stored energy of the lost motion connection when the rib is moved away from the first axis.

In yet another construction, the invention provides a steering lock for selectively inhibiting rotation of a rotary steering member having a rib. The steering lock includes a lockbolt movable along a first axis between a steering member-locking position, in which a distal tip of the lockbolt is positioned in interference with the rib, and a steering member-unlocking position, in which the distal tip of the lockbolt is positioned out of interference with the rib. A shuttle is movable between a non-blocking position, in which the shuttle does not obstruct movement of the lockbolt from the steering member-locking position to the steering member-unlocking position, and a blocking position, in which the shuttle obstructs movement of the lockbolt out of the steering member-locking position. An actuator is coupled to the shuttle and operable to drive the lockbolt to the steering member-locking position by moving the shuttle from the non-blocking position to the blocking position. The lockbolt is unbiased along the first axis.

In yet another construction, the invention provides a steering lock for selectively inhibiting rotation of a rotary steering member having a rib. The steering lock includes a lockbolt movable along a first axis between a steering member-locking position, in which a distal tip of the lockbolt is positioned in interference with the rib, and a steering member-unlocking position, in which the distal tip of the lockbolt is positioned out of interference with the rib. A shuttle moves between a non-blocking position, in which the shuttle does not obstruct movement of the lockbolt from the steering member-locking position, and a blocking position, in which the shuttle obstructs movement of the lockbolt out of the steering member-locking position. An actuator is operatively coupled to the shuttle and operable to drive the lockbolt to the steering member-locking position by moving the shuttle from the non-blocking position to the blocking position. An output gear is drivable by the actuator. A rotary drive member has a first portion formed with gear teeth meshed with the output gear, and a second portion formed with a driving structure engaged with a follower structure of the shuttle, whereby the shuttle is configured to translate axially toward and away from the first axis when the rotary drive member is rotated in place. In some constructions, the driving structure of the rotary drive member includes a spiral cam (e.g., a spiral cam groove). In other constructions, the driving structure of the rotary drive member includes a threaded drive portion and the shuttle includes a threaded follower structure.

In yet another construction, the invention provides an actuation device for a steering lock which is operable to selectively inhibit rotation of a rotary steering member having a rib. A lockbolt is movable along a first axis between a steering member-locking position and a steering member-unlocking position. A shuttle is movable between a non-blocking position, in which the shuttle does not obstruct movement of the lockbolt from the steering member-locking position to the steering member-unlocking position, and a blocking position, in which the shuttle obstructs movement of the lockbolt from the steering member-locking position to the steering member-unlocking position. An actuator is operatively coupled to the shuttle via a crank and operable to move the shuttle from the non-blocking position to the blocking position by rotating the crank in a first locking direction, and to move the shuttle from the blocking position to the non-blocking position by rotating the crank in a second unlocking direction. The crank is configured to be rotated by the actuator so that the shuttle passes through and past a top-dead-center condition with respect to the crank when moved into the blocking position so that any back-driving force on the shuttle from the lockbolt can only further urge the crank in the first locking direction.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
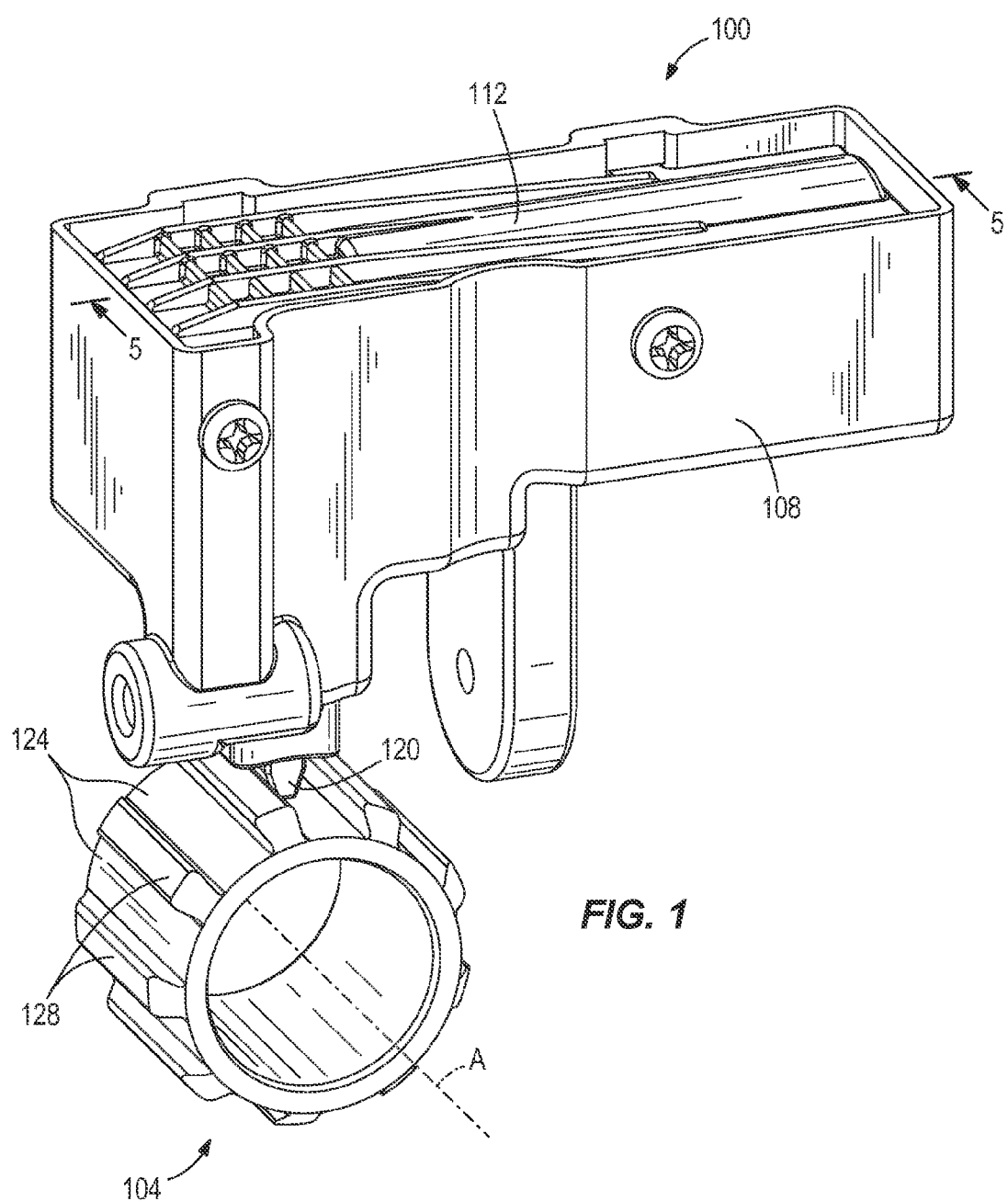
FIG. 1 is a perspective view of a steering lock in a locked state.
Figure 2:
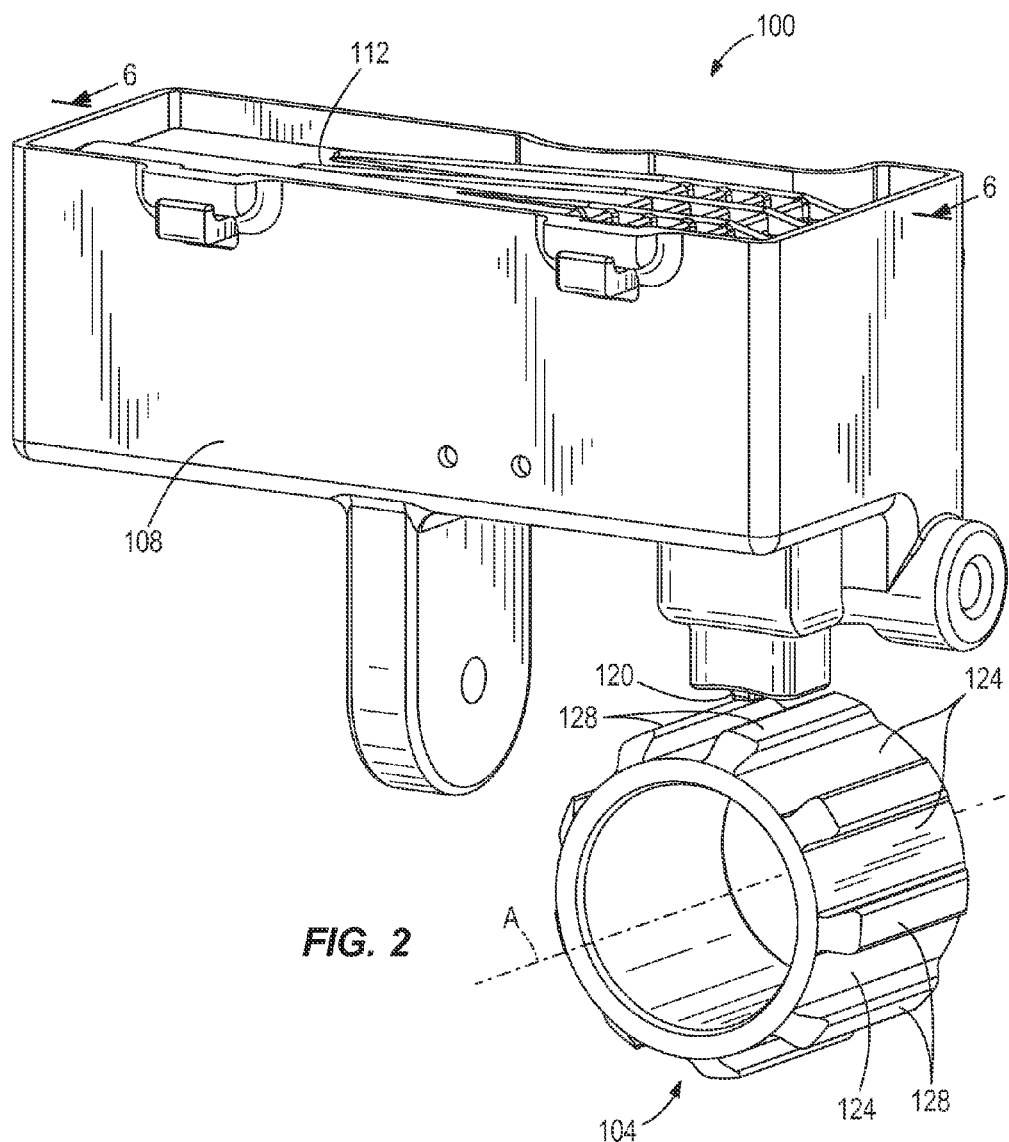
FIG. 2 is a perspective view of the steering lock of FIG. 1 in an unlocked state.

FIGS. 1 and 2 illustrate a steering lock 100 operable to selectively lock an adjacent steering member 104 against rotation about its axis A. The steering lock 100 includes a housing 108 that is mounted at a predetermined location proximate the steering member 104. A cover 112 is removably coupled to the housing 108 to enclose an actuation device 116 of the steering lock 100. The actuation device 116, illustrated in FIGS. 3 and 4 and discussed in further detail below, includes a lockbolt 120 that is movable between a steering member-locking position or simply "locked" position (FIG. 1) and a steering member-unlocking position or simply "unlocked" position (FIG. 2). In the illustrated construction, the lockbolt 120 is movable between the locked and unlocked positions along an axis B that is substantially perpendicular to the axis A of the steering member 104.

As shown in at least FIGS. 1 and 2, the ring-shaped steering member 104 includes a plurality of notches or grooves 124 that are elongated parallel to the axis A. Each adjacent pair of grooves 124 are separated by a rib 128. When the steering lock 100 is locked, the lockbolt 120 is positioned within one of the grooves 124, and interference between the lockbolt 120 and the two adjacent ribs 128 prevent substantial rotation of the steering member 104 about the axis A. The size, shape, and number of the grooves 124 and the ribs 128 can be varied from the illustrated construction according to the needs of a particular application. Although limited rotation of the steering member 104 may be possible in some circumstances when locked by the steering lock 100, the steering mechanism (e.g., steering wheel, handlebars, etc.) to which the steering member 104 is coupled is rendered unusable for normal operation of the vehicle on which the steering lock 100 is provided.

Figure 3:
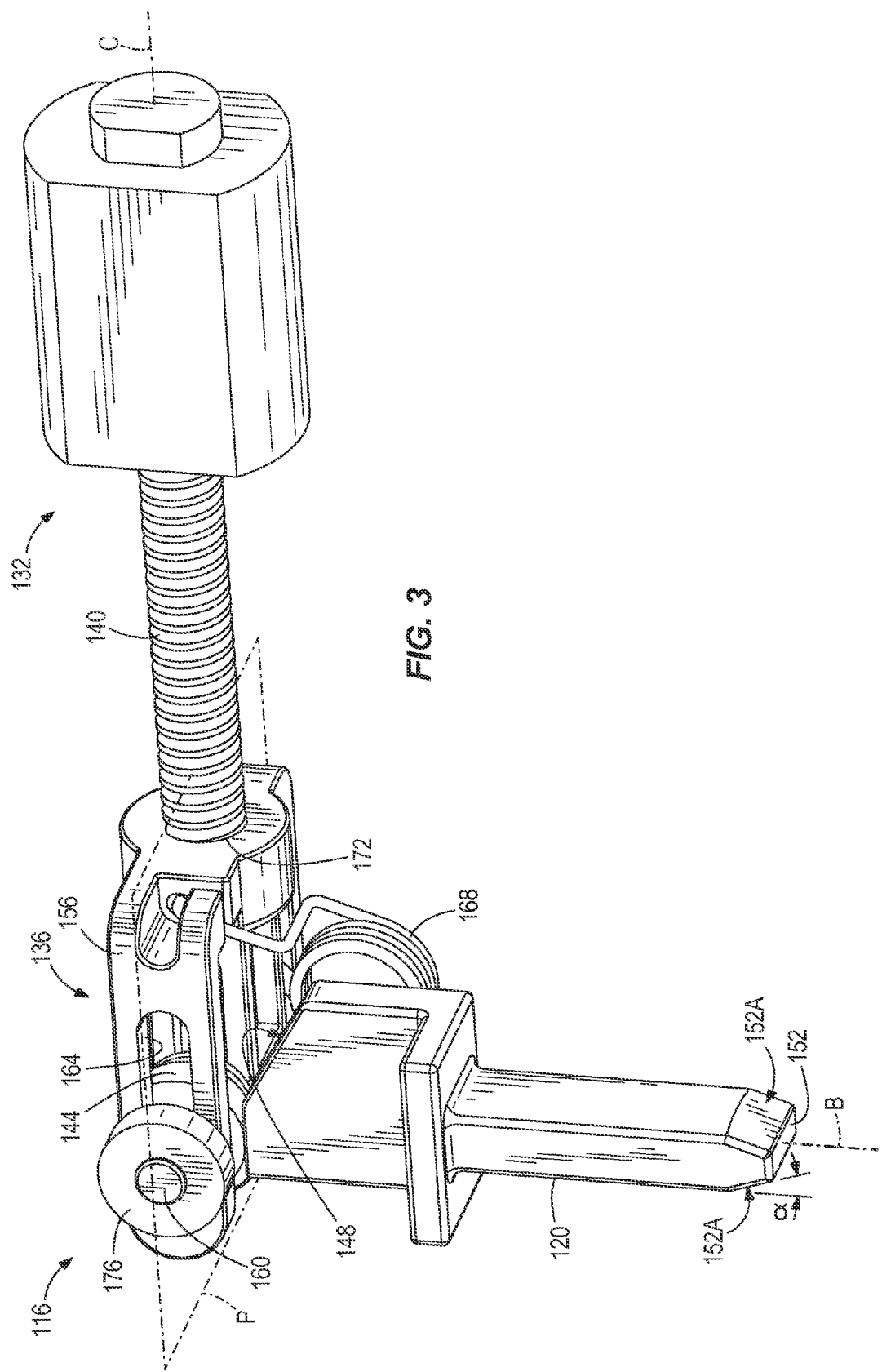
FIG. 3 is a perspective view of an actuation device of the steering lock of FIG. 1.
Figure 4:
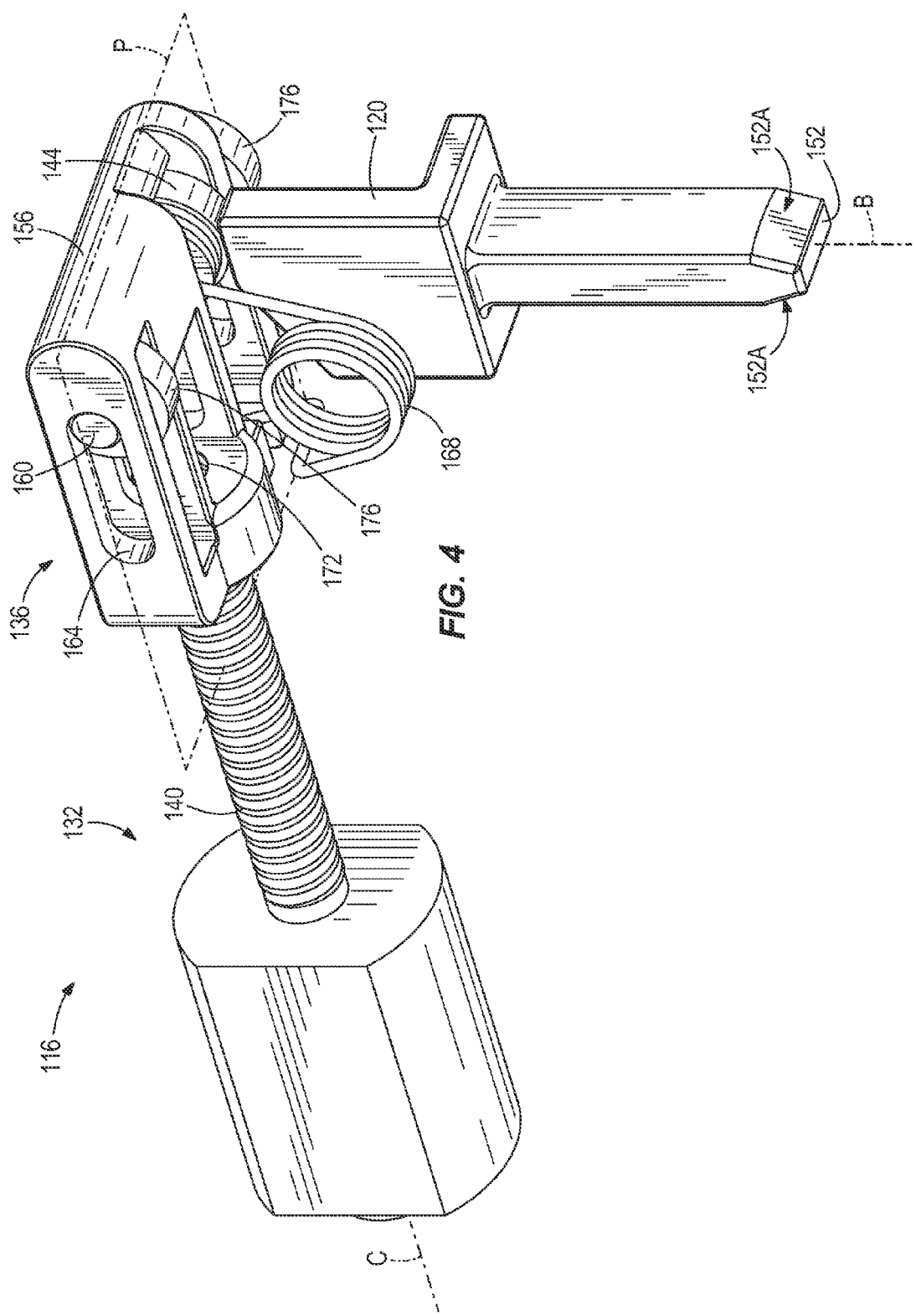
FIG. 4 is a second perspective view of the actuation device of FIG. 3.

As shown in FIGS. 3 and 4, the actuation device 116 includes an actuator 132 and a shuttle 136 in addition to the lockbolt 120. The actuator 132 of the illustrated construction is an electric motor, although other types of actuators may be used. As discussed in further detail below, in some constructions the actuator 132 is an electric motor rated for less than 1.0 A of current at max load. In some constructions, the actuator 132 is an electric motor rated for about 500 mA of current at max load. As shown in FIGS. 3 and 4, the actuator 132 includes an output shaft 140. In the illustrated construction, the output shaft 140 is a lead screw rotatable about an axis C defined by the actuator 132. The lead screw may have a pitch of about 10 teeth per inch.

Although the output shaft 140 is provided as a direct rotary drive member extending directly from the actuator 132, the actuator 132 may be coupled to the output shaft 140 by a power transmission device such as a gear train having one or more gears that alter the torque and speed of the output shaft 140. In such constructions, the output shaft 140 may have an axis that is different from the axis of the actuator 132, and may be linearly offset or angled relative thereto. Such an arrangement may not only provide a desired gear ratio but also a desired orientation of components (e.g., for more efficient packaging, etc.). For example, FIG. 8 illustrates a steering lock 200 including an output shaft 240 that is offset from the actuator 232. Except as described herein, the steering lock 200 is otherwise substantially identical to the steering lock 100 of FIGS. 1-7. As such, similar reference characters (with leading digits increased by 100) are used for similar parts where appropriate. Reference is made to the above description of the steering lock 100 for features and aspects of the steering lock 200 of FIG. 8 not specifically described below.

In the steering lock 200 of FIG. 8, the output shaft 240 is offset from the axis C2 of the actuator 232. In the illustrated construction, the output shaft 240 is parallel to the axis C2 of the actuator 232 and is coupled to the actuator 232 by a power transmission device (e.g., gear train). Although other offset arrangements are optional, the actuator 232 includes a shaft 239 provided with a drive gear 241. The output shaft 240 is provided with a driven gear 243 that is rotated by the drive gear 241 of the actuator 232. The driven gear 243 and the output shaft 240 form a rotary drive member which is drivable by the actuator 232 and is operable to drive the shuttle 236. The available torque at the output shaft 240 is increased and its angular velocity is decreased by driving it through the two gears 241, 243 instead of being driven directly by the shaft 239 of the actuator 232. Thus, the output shaft 240 (which is configured as a lead screw in the illustrated construction) may be provided with fewer threads per inch than the output shaft 140 of the steering lock 100 of FIGS. 1-7. For example, the output shaft 240 of FIG. 8 may be provided with only about 4 teeth per inch. The housing 208 is provided with a pair of internal cradles 249 for rotatably supporting the output shaft 240 on both sides of the driven gear 243.

Returning now to the construction illustrated in FIGS. 1-7, the shuttle 136 is engaged with the output shaft 140 to be moved between two positions by the actuator 132. The first position of the shuttle 136 is a blocking position (FIG. 3) in which the shuttle 136 obstructs movement of the lockbolt 120 from the locked position (FIG. 1) to the unlocked position (FIG. 2). The second position of the shuttle 136 is a non-blocking position in which the shuttle 136 does not obstruct movement of the lockbolt 120 from the locked position (FIG. 1) to the unlocked position (FIG. 2). As described in further detail below, the shuttle 136 is configured to move in a plane P that is substantially perpendicular to the lockbolt axis B.

In some constructions, as shown in FIGS. 3-7, the shuttle 136 includes a cam roller 144 and the lockbolt 120 includes a cam follower surface 148. In the illustrated construction, the cam follower surface 148 is opposite a tip or engagement end 152 of the lockbolt 120 which is engageable with the steering member 104. The cam follower surface 148 includes a first portion 148A that is inclined relative to both the lockbolt axis B and the plane P in which the shuttle moves and a second portion 148B that is substantially perpendicular to the lockbolt axis B and parallel to the shuttle's plane of movement P. Movement of the cam roller 144 along the cam follower surface 148 occurs with rolling contact which limits the amount of friction that the actuator 132 must overcome to move the shuttle 136.

The shuttle 136 further includes a guide body 156, which supports and guides the cam roller 144. In the illustrated construction, the cam roller 144 is mounted on a shaft 160 that extends through a slot 164 formed in the guide body 156. The slot 164 is elongated in a direction substantially perpendicular to the lockbolt axis B. A spring 168 of the shuttle 136 biases the shaft 160 and the cam roller 144 to an end of the slot 164 that is furthest away from the output shaft 140 of the actuator 132. In the illustrated construction, the spring 168 is a torsion spring that can function as a lost motion device as described in further detail below.

The guide body 156 of the shuttle 136 includes a threaded aperture 172 that is engaged with the output shaft 140 of the actuator 132 and coaxial with its axis C. In the illustrated construction, the output shaft 140, which is a lead screw, rotates about the axis C and drives motion of the shuttle along the axis C (within the shuttle's plane of movement P). In other constructions, the output shaft 140 of the actuator 132 may be configured to move in and out of the actuator 132 along the axis C such that the shuttle 136 may be fixed relative to the output shaft 140 and moved directly with the output shaft 140. In yet other constructions, the actuator 132 may be configured to rotate the shuttle 136 (within the plane P) between the blocking position and the non-blocking position. Furthermore, a separate nut (not shown) may be provided rather than providing the threaded aperture 172 directly in the guide body 156. This not only allows different materials to be used for the guide body 156 and the nut as desired, but also allows the establishment of a dynamic relationship between the nut and the guide body 156. For example, the nut can be made slidable within the guide body 156 so that, when the output shaft 140 rotates, the nut travels relative to the guide body 156 and achieves a running speed before contacting the guide body 156. This reduces the starting load on the actuator 132 and provides an impact-type actuation of the shuttle 136, and specifically the guide body 156.

As shown in FIGS. 3 and 4, the shuttle 136 includes auxiliary rollers 176 mounted on the shaft 160 of the cam roller 144. The auxiliary rollers 176, the shaft 160, and the cam roller 144 constitute a roller unit of the shuttle 136 that is movable relative to the guide body 156. The auxiliary rollers 176 are guided by internal guide surfaces 178 of the housing 108 and the cover 112. The guide surfaces 178 are flat so that the contact between the auxiliary rollers 176 and the guide surfaces 178 keep the movement of the shuttle 136 within the desired plane P. The auxiliary rollers 176 provide a guiding function with rolling contact which limits the amount of friction that the actuator 132 must overcome to move the shuttle 136.

Figure 5:
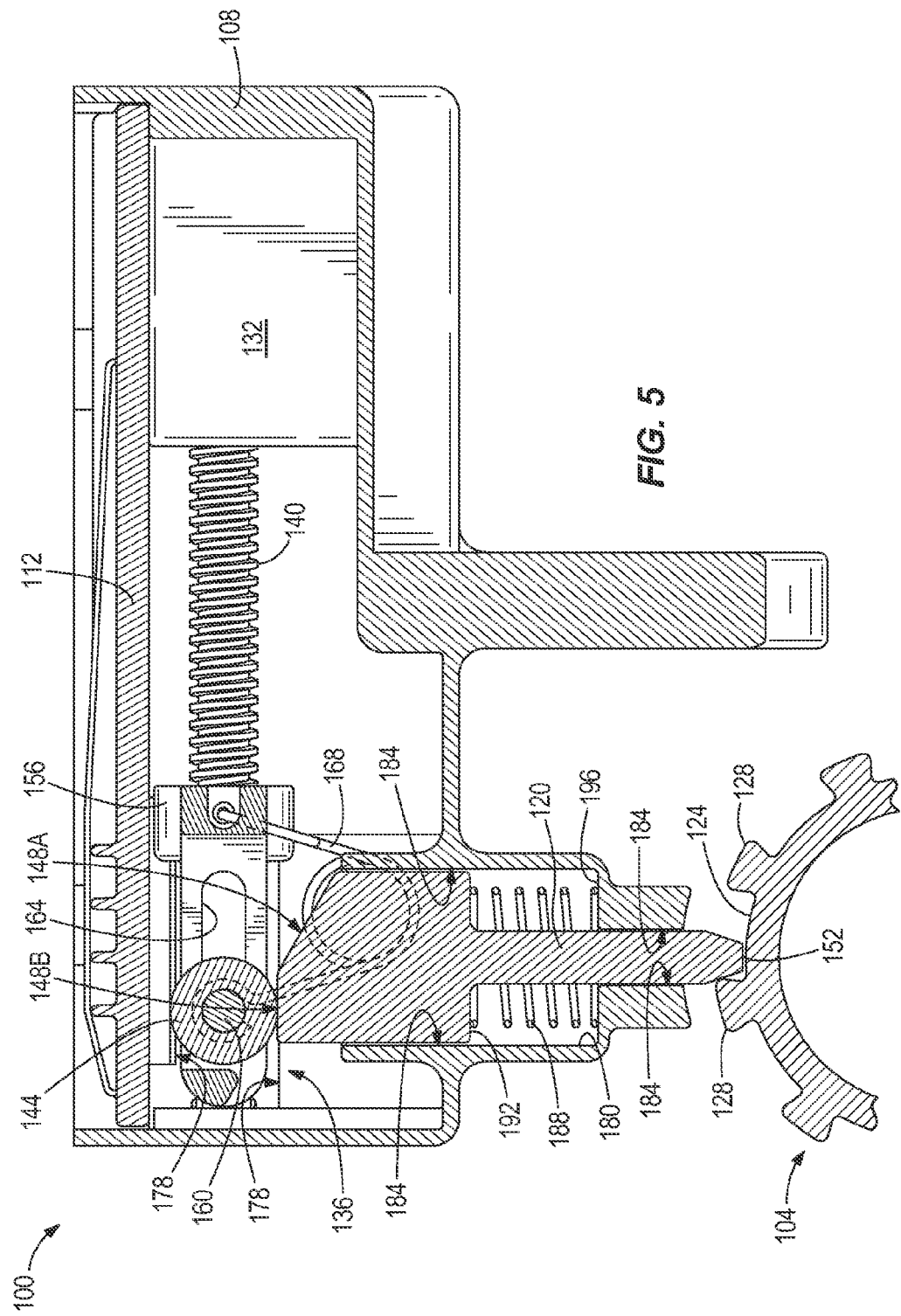
FIG. 5 is a cross-sectional view of the steering lock, taken along line 5-5 of FIG. 1.
Figure 6:
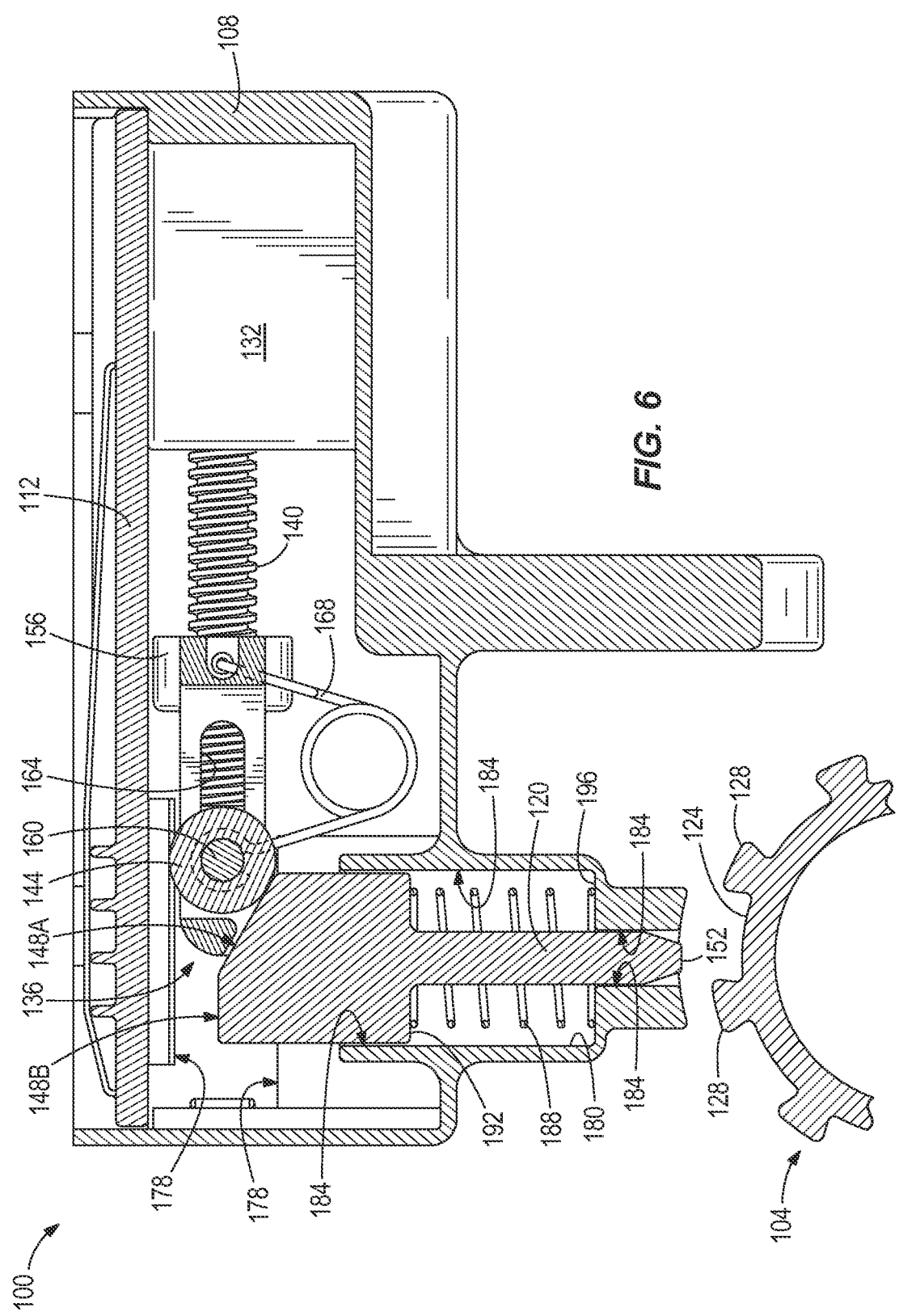
FIG. 6 is a cross-sectional view of the steering lock, taken along line 6-6 of FIG. 2.
Figure 7:
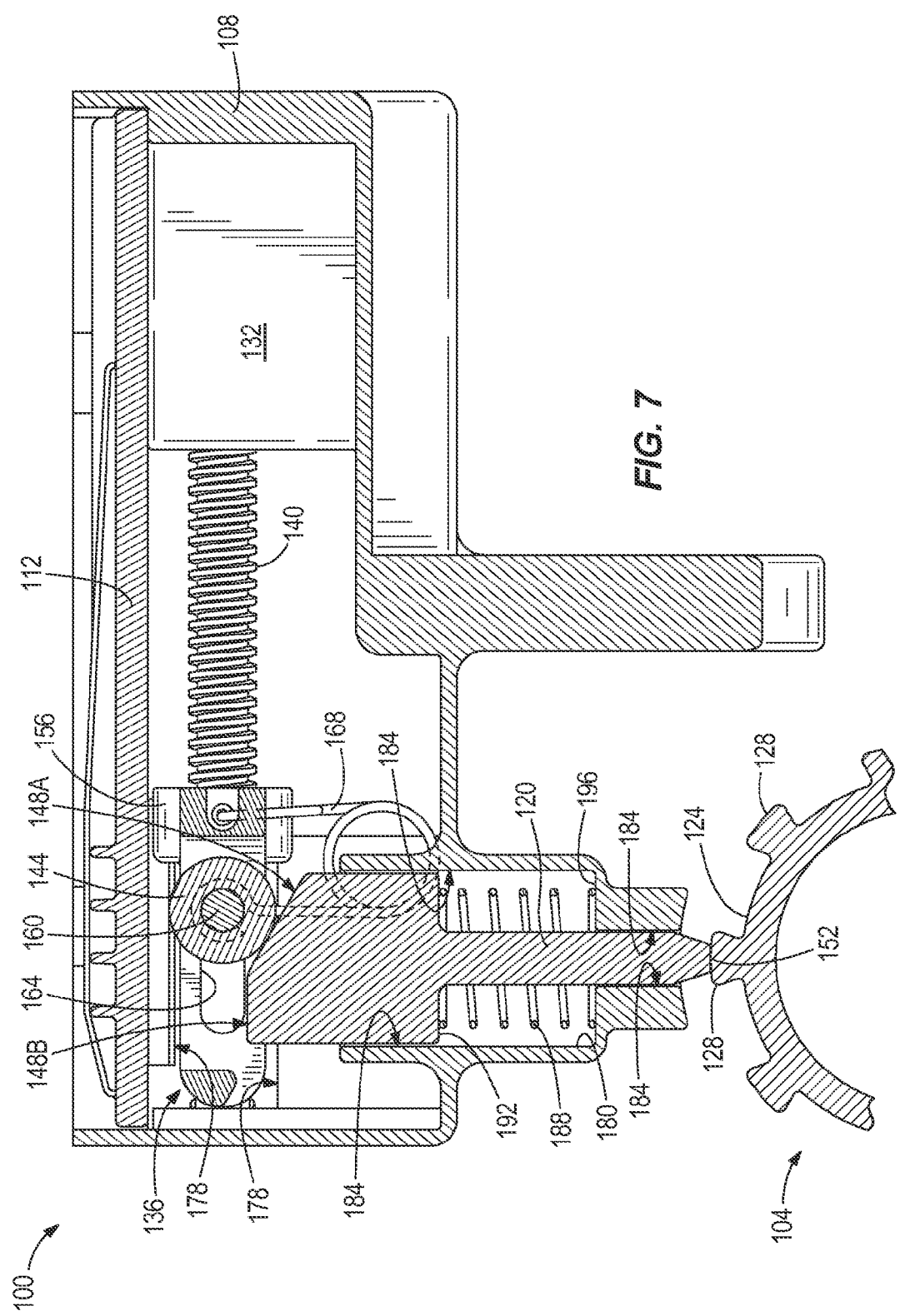
FIG. 7 is a cross-sectional view of the steering lock of FIG. 1 in a state in which a lockbolt is obstructed from reaching the locked state when actuated.
Figure 8:
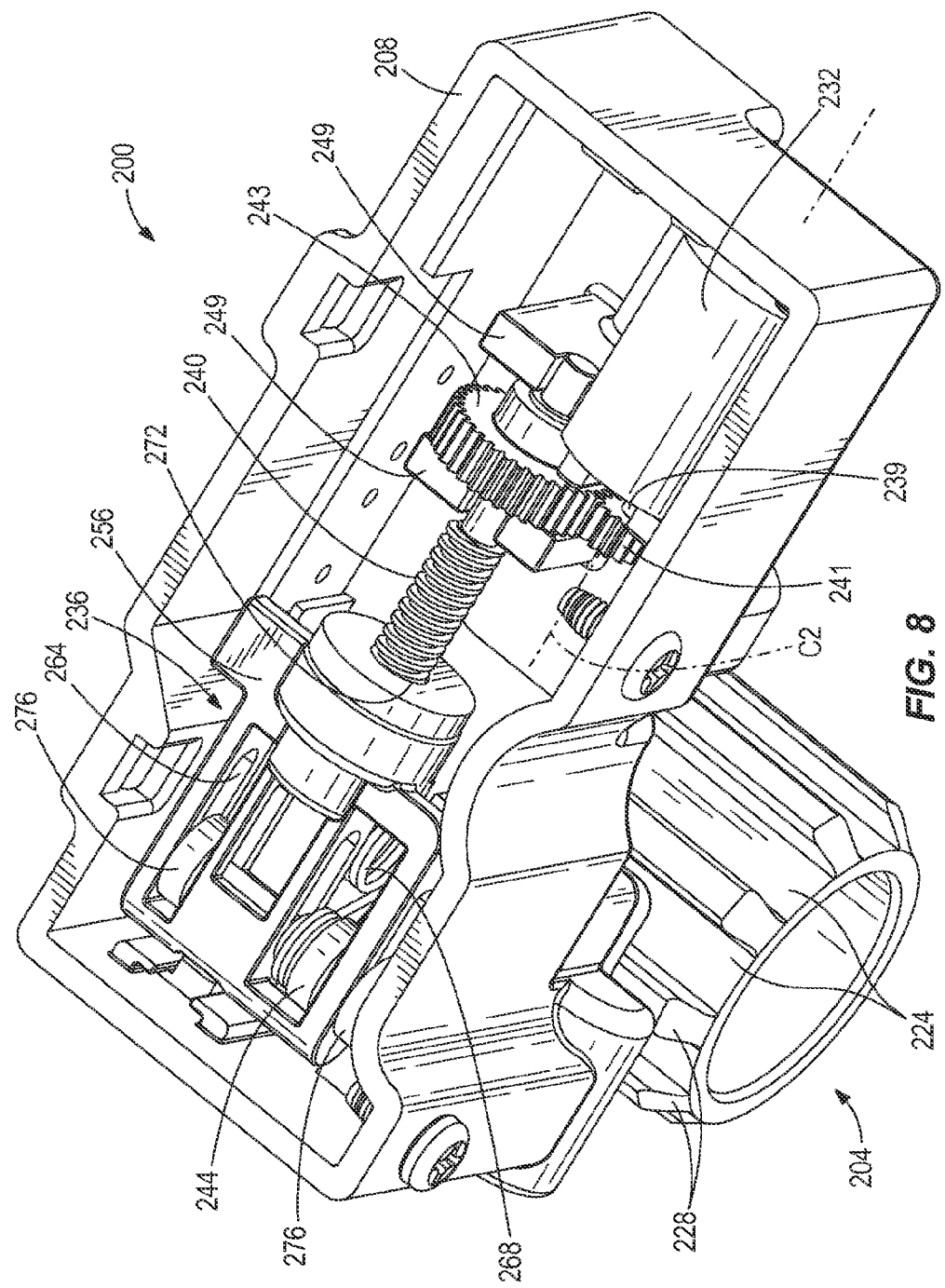
FIG. 8 is a perspective view of a steering lock according to another construction in which the output shaft is offset from the actuator axis.

As shown in FIGS. 5-7, the housing 108 includes an internal recess 180 in which the lockbolt 120 is positioned. The internal recess 180 is provided with a plurality of guide surfaces 184 that guide movement of the lockbolt 120 along the axis B. A spring 188 is positioned between respective abutment surfaces 192, 196 of the lockbolt 120 and the internal recess 180. The spring 188 biases the lockbolt 120 in a direction along the axis B that tends to retract the lockbolt 120 into the housing 108 and away from the steering member 104. In other words, the spring 188 biases the lockbolt 120 toward the unlocked position.

In operation, the steering lock 100 is kept in the unlocked state (FIGS. 2 and 6) during normal operation of the vehicle. In this manner, the steering member 104 can rotate freely about its axis A without obstruction from the lockbolt 120. Upon being commanded by the operator or automatically by a predetermined function of the vehicle's security system, the steering lock 100 can be moved to the locked state (FIGS. 1 and 5).

In order to move the steering lock 100 to the locked state, the actuator 132 is powered. Powering the actuator 132 may include supplying electrical current to an electric motor via an electrical circuit, but may alternately include supplying energy to the output shaft 140 by mechanical or fluid means. When the output shaft 140 is constructed as a lead screw, rotation of the output shaft 140 drives the guide body 156 to move parallel to the axis C of the actuator 132. The spring 168 between the guide body 156 and the cam roller 144 is strong enough to transfer the motion from the guide body 156 to the cam roller 144 so that the cam roller 144 rolls from the inclined first portion 148A of the cam follower surface 148 to the second portion 148B, thereby overcoming the bias of the lockbolt spring 188 and moving the lockbolt 120 to the locked position (FIG. 5).

The above description of how the actuation device 116 moves the lockbolt 120 to the locked position assumes that the lockbolt 120 is aligned with one of the notches 124 of the steering member 104 and not one of the intermediate ribs 128. However, there is a significant chance that, at the time that the actuator 132 is powered to move the steering lock 100 from the unlocked state to the locked state, the lockbolt 120 will be aligned with one of the ribs 128. This occurrence is illustrated in FIG. 7. In the event that the lockbolt 120 is aligned with one of the ribs 128 when actuated, the actuator 132 still actuates and moves the guide body 156 of the shuttle 136 just as it would if the lockbolt 120 were aligned with one of the notches 124. However, the movement of the lockbolt 120 is stopped prematurely when the tip 152 contacts the top of the rib 128. As the actuator 132 continues to move the guide body 156, the spring 168 acts as a lost motion device, storing energy while the cam roller 144 remains in contact with the inclined cam follower surface portion 148A. The slot 164 in the guide body 156 allows the guide body 156 to move relative to the shaft 160 and the cam roller 144. The lost motion device prevents an overloading of the actuator 132 when the lockbolt 120 contacts the top of a rib 128 and allows the lockbolt 120 to later move to the locked position without further powering the actuator 132. As soon as the steering member 104 is moved slightly to remove the obstructing rib 128 from the path of the lockbolt 120, the energy stored in the spring 168 is released, driving the cam roller 144 to the second portion of the cam follower surface 148B and simultaneously moving the lockbolt 120 into the locked position.

In some instances, one of the ribs 128 of the steering member 104 may become wedged against the lockbolt 120 when the lockbolt 120 is in the locked position. For example, this may occur when one or more of the steerable wheels coupled to the steering member 104 are wedged against a stationary object, such as a curb. When a wedged condition exists and it is desired to move the steering lock 100 from the locked state to the unlocked state (thereby withdrawing the lockbolt 120 from the steering member 104), the actuator 132 operates normally and one or more passive features assist in releasing the lockbolt 120 from the wedged condition. The steering lock 100 does not rely on the power supplied by the actuator 132 to extract or "un-wedge" the lockbolt 120. In fact, the actuator 132 and the shuttle 136 provide "push-only" actuation of the lockbolt 120, and in some constructions, are not coupled in a manner that enables urging of the lockbolt 120 toward the unlocked position by the power of the actuator 132. Because the actuator 132 is not designed to extract the lockbolt 120 from a wedged condition, the power rating for the actuator 132 can be kept low. This lends to lower cost of the actuator 132 and associated running circuitry as well as generally smaller size and easier packaging.

One passive feature that aids in releasing the lockbolt 120 from a wedged condition is the tapered tip 152 of the lockbolt 120. When locked, two tapered surfaces 152A of the tip 152 interfere with and potentially contact the steering member ribs 128 are tapered by an angle $\alpha$. from the adjacent flat sides of the lockbolt 120. Because the adjacent flat sides of the lockbolt 120 are substantially parallel with the lockbolt axis B, the same angle $\alpha$ is made between the tapered surfaces 152A and the lockbolt axis B. From the wedged condition, rotation of the steering member 104 causes the side of one of the ribs 128 to contact one of the tapered surfaces 152A of the tip 152. Thus, torque from the steering member 104 generates a camming reaction along axis B that urges the release of the lockbolt 120 from the wedged condition with the steering member 104. In some constructions, the angle $\alpha$ is between about 10 degrees and about 20 degrees. When the angle $\alpha$ is made too high, torque from the steering member 104 is transmitted to a large degree along the axis B of the lockbolt 120. These large forces must be borne by the actuation device 116 to keep the lockbolt 120 in the locked position. Thus, the structural demands on the shuttle 136, the output shaft 140, etc. are higher. On the other hand, when the angle $\alpha$ is made too small, a very large torque from the steering member 104 is required to produce a camming force (along axis B) sufficient to release the lockbolt 120 from the wedged condition. In certain constructions, such as the illustrated construction, an angle α between about 12 degrees and about 16 degrees may provide an advantageous balance of these design considerations.

Another passive feature that aids in releasing the lockbolt 120 from a wedged condition is the spring 188, which is compressed from its at-rest state when the lockbolt 120 is in the locked position. Therefore, the spring 188 stores energy that urges the lockbolt 120 to the unlocked position whenever the lockbolt 120 is in the locked condition, including when in a wedged condition.

As mentioned above, the operation of the actuator 132 is not affected whatsoever by the existence of a wedged condition. The actuator 132 operates to draw the shuttle 136 and thus the cam roller 144 out of the blocking position of FIG. 5 and toward the non-blocking position of FIG. 6. However, movement of the shuttle 136 does not directly cause movement of the lockbolt 120 to the unlocked position. Once the shuttle 136 and the cam roller 144 are moved out of the way, the tapered tip 152 and the spring 188 work together to drive the lockbolt 120 from the wedged condition without active pulling or powered extraction via the actuator 132 or any other powered device acting on the lockbolt 120.

FIGS. 9-12 illustrate a steering lock 300 according to yet another construction. The steering lock 300 of FIGS. 9-12 is similar in many aspects to the steering lock 100 of FIGS. 1-7. Reference characters, with leading digits incremented by 100, are re-used where appropriate for consistency. Reference is made to the above description of the steering lock 100 for features and aspects of the steering lock 300 of FIGS. 9-12 not specifically described below.

Figure 9:
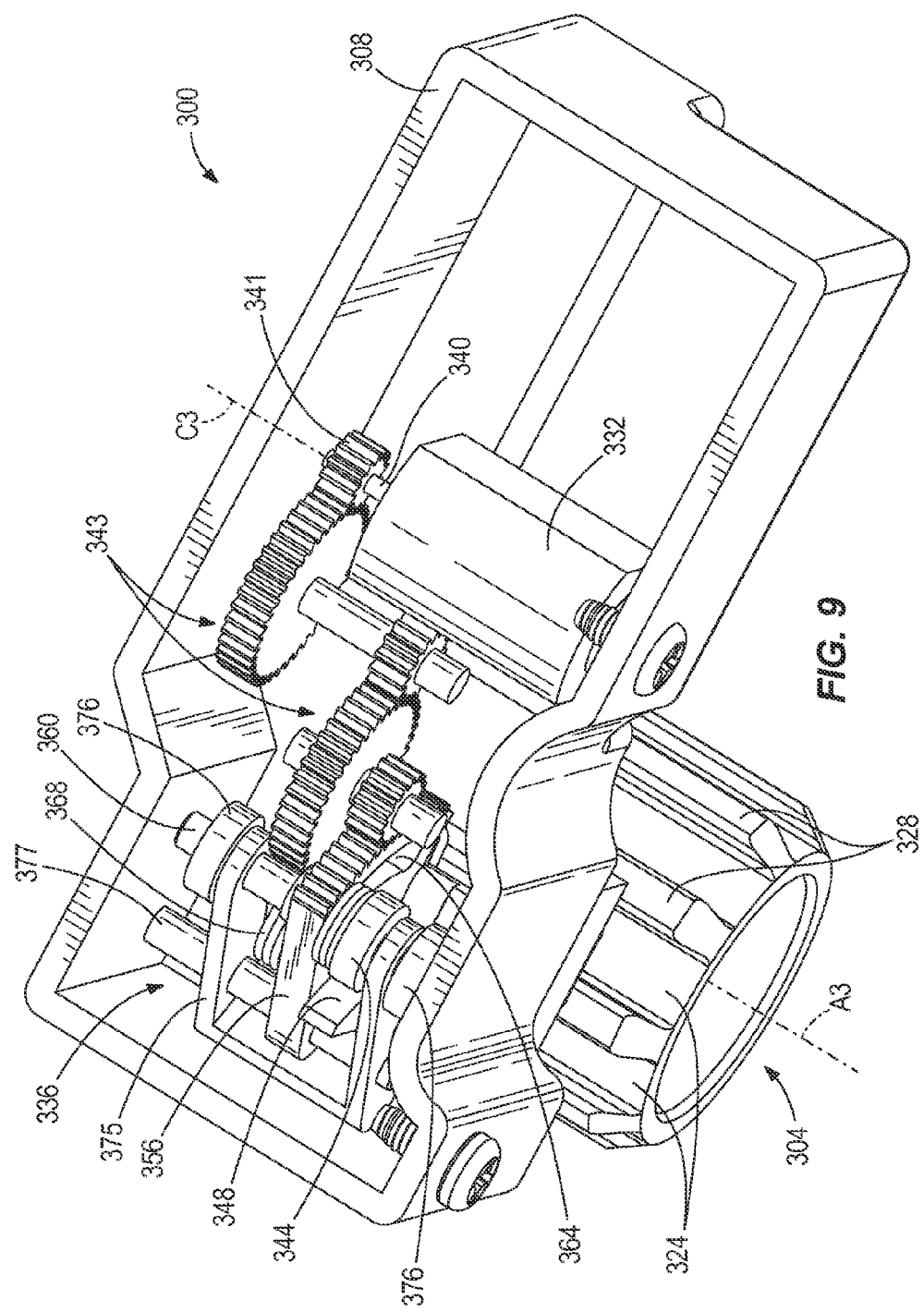
FIG. 9 is a perspective view of a steering lock according to another construction in which a rotary shuttle is provided.
Figure 10:
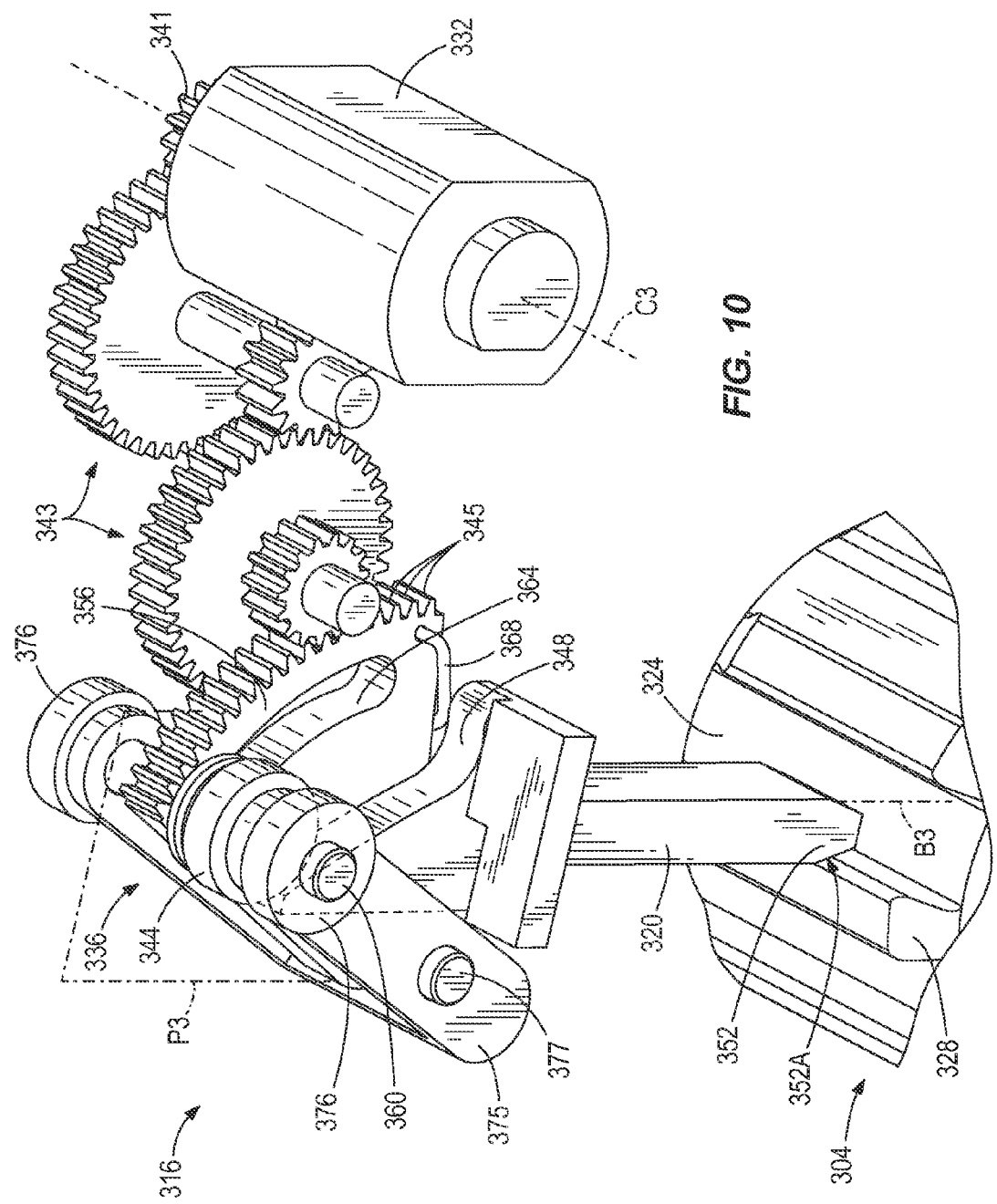
FIG. 10 is a perspective view of the steering lock of FIG. 9 in a locked state.
Figure 11:
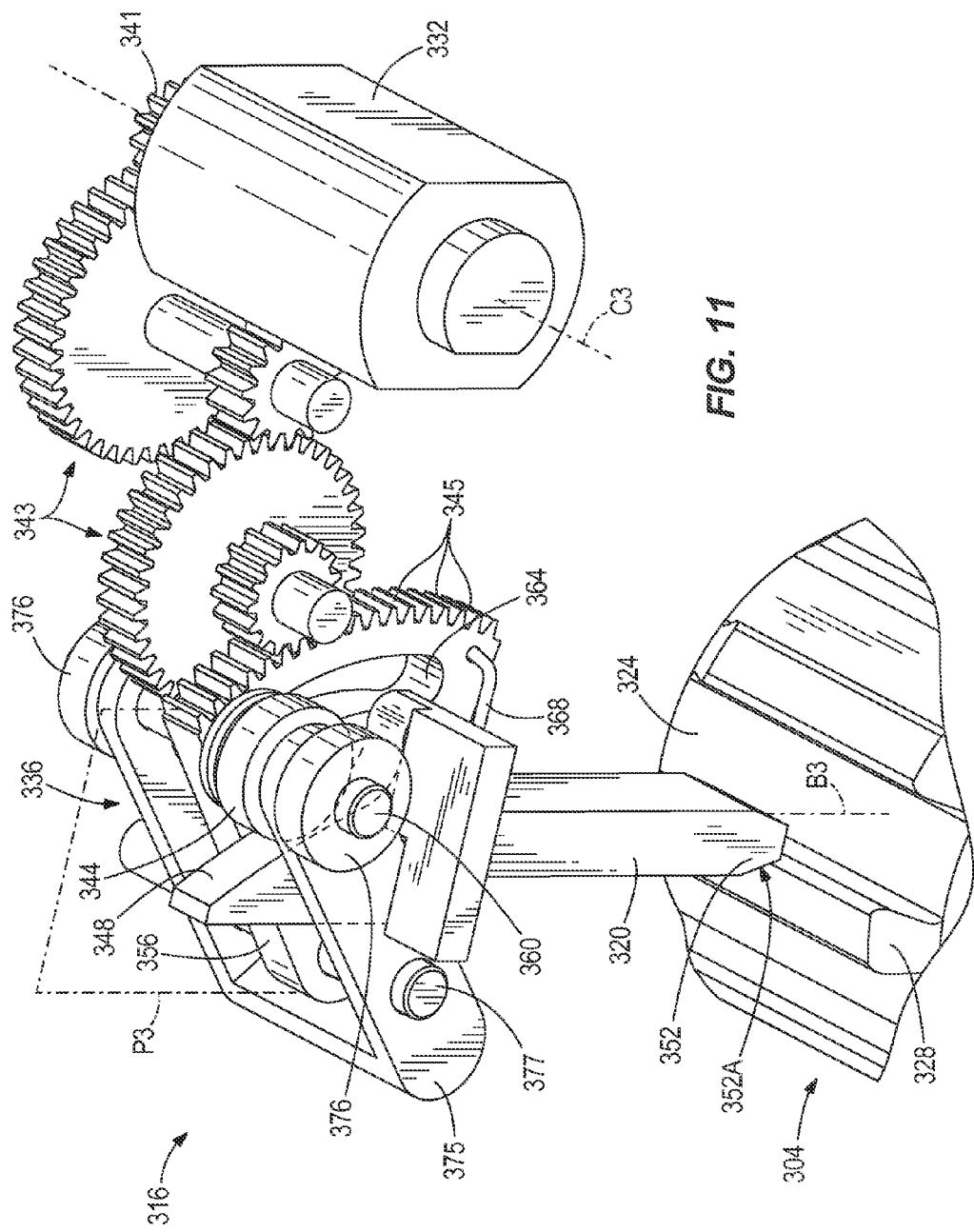
FIG. 11 is a perspective view of the steering lock of FIG. 9 in an unlocked state.
Figure 12:
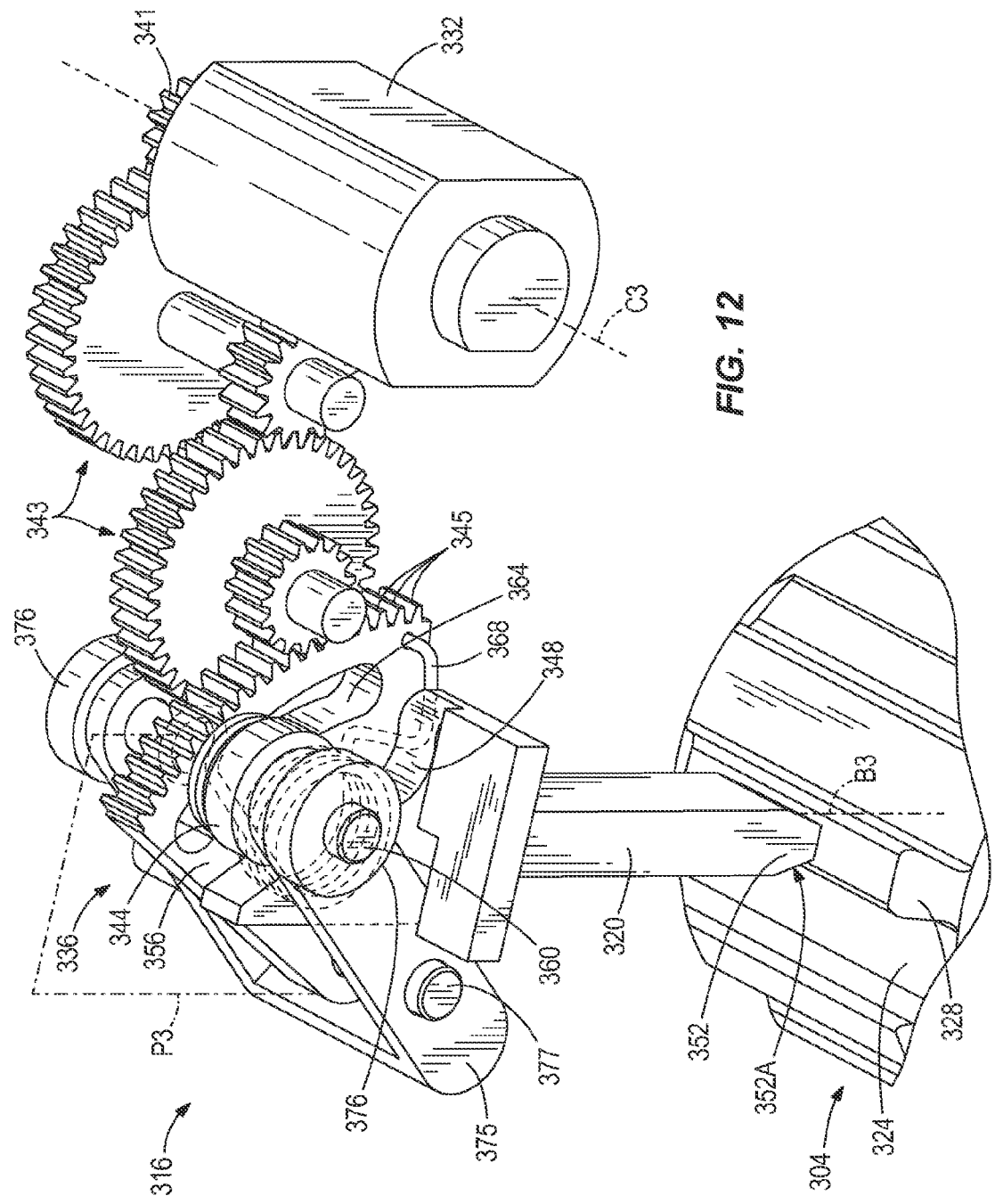
FIG. 12 is a perspective view of the steering lock of FIG. 9 in a state in which a lockbolt is obstructed from reaching the locked state when actuated.

FIG. 9 illustrates the steering lock 300 without the cover of the housing 308, and FIGS. 10-12 illustrate the steering lock 300 without the housing 308 at all so that the actuation device 316 can be seen clearly. As with the steering lock 100, the steering lock 300 of FIGS. 9-12 includes a lockbolt 320 that is movable between a steering member-locking position or simply "locked" position (FIG. 10) and a steering member-unlocking position or simply "unlocked" position (FIG. 11). In the illustrated construction, the lockbolt 320 is movable between the locked and unlocked positions along an axis B3 that is substantially perpendicular to the axis A3 of the steering member 304.

The actuator 332 of the steering lock 300 includes an output shaft 340 provided with a drive gear 341. The output shaft 340 and the drive gear 341 define an axis C3. The shuttle 336 is driven back and forth between blocking and non-blocking positions by the drive gear 341. In the illustrated construction, a plurality of intermediate gears 343 are positioned between the drive gear 341 and a set of gear teeth 345 on the guide body 356 of the shuttle 336. The intermediate gears 343 provide a reduction in angular velocity and an increase in torque from the output shaft 340. The intermediate gears 343 serve as rotary drive members that are drivable by the actuator 332 and operable to drive the shuttle 336, which in the illustrated construction is also rotatable or pivotable.

The guide body 356 pivots within the housing and moves in a plane P3 that is perpendicular with the axis C3 of the output shaft 340 and parallel to the axis B3 of the lockbolt 320. In some constructions, the guide body 356 and actuator 332 have alternate orientations. For example, the guide body 356 and actuator 332 may be configured to be turned 90 degrees so that the axis C3 of the output shaft 340 is parallel to the axis B3 of the lockbolt 320 and the guide body 356 moves in a plane that is perpendicular to the axis B3 of the lockbolt 320. The housing 308 includes at least one internal guide surface (not shown) similar to those of the housing 108 for guiding movement of the guide body 356, however the guide surface is arc-shaped to guide the pivoting movement of the guide body 356.

In addition to the guide body 356, the shuttle 336 includes a cam roller 344 and auxiliary rollers 376. The cam roller 344 is mounted on a shaft 360 that is received in an arc-shaped slot 364 in the guide body 356. The cam roller 344 contacts an arc-shaped cam follower surface 348 to selectively actuate the lockbolt 320 from the unlocked position to the locked position. Similar to the actuation device 116 described above, the actuator 332 and the shuttle 336 are only operable to actuate the lockbolt 320 to the locked position and block the lockbolt 320 from returning to the unlocked position, and are not configured to actively retract the lockbolt 320 from the locked position.

Unlike the shuttle 136 of FIGS. 1-7 in which the shaft 160 simply slides back and forth in the slot 164 to allow movement of the cam roller 144 relative to the guide body 156, the shaft 360 on which the cam roller 344 of the steering lock of FIGS. 9-12 is supported by a pivot arm 375 that is coupled to the guide body 356 with a pivot shaft 377.

Similar to the shuttle 136 described above, the shuttle 336 includes a spring 368 that biases the shaft 360 and the cam roller 344 to one end of the slot 364. In the illustrated construction, the spring 368 is a torsion spring that can function as a lost motion device when, at the time that the actuator 332 is powered to move the lockbolt 320 from the unlocked position to the locked position, the lockbolt 320 is aligned with one of the ribs 328 on the steering member 304. When this occurs, the spring 368 stores energy as the guide body 356 moves to the blocking position and the cam roller 344 remains in the non-blocking position. The slot 364 in the guide body 356 allows the guide body 356 to move relative to the shaft 360 and the cam roller 344. The lost motion device prevents an overloading of the actuator 332 when the lockbolt 320 contacts a rib 328. As soon as the steering member 304 is moved slightly to remove the obstructing rib 328 from the path of the lockbolt 320, the energy stored in the spring 368 is released so that the cam roller 344 drives the lockbolt 320 into the locked position and blocks it from retraction to the unlocked position.

FIGS. 13-17 illustrate a steering lock 400 according to yet another construction. The steering lock 400 of FIGS. 13-17 is similar in some aspects to the steering locks 100, 200, 300 of FIGS. 1-12. Reference characters, with leading digits incremented by 100, are re-used where appropriate for consistency. Reference is made to the above description of the steering locks 100, 200, 300 for features and aspects of the steering lock 400 of FIGS. 13-17 not specifically described below.

Figure 13:
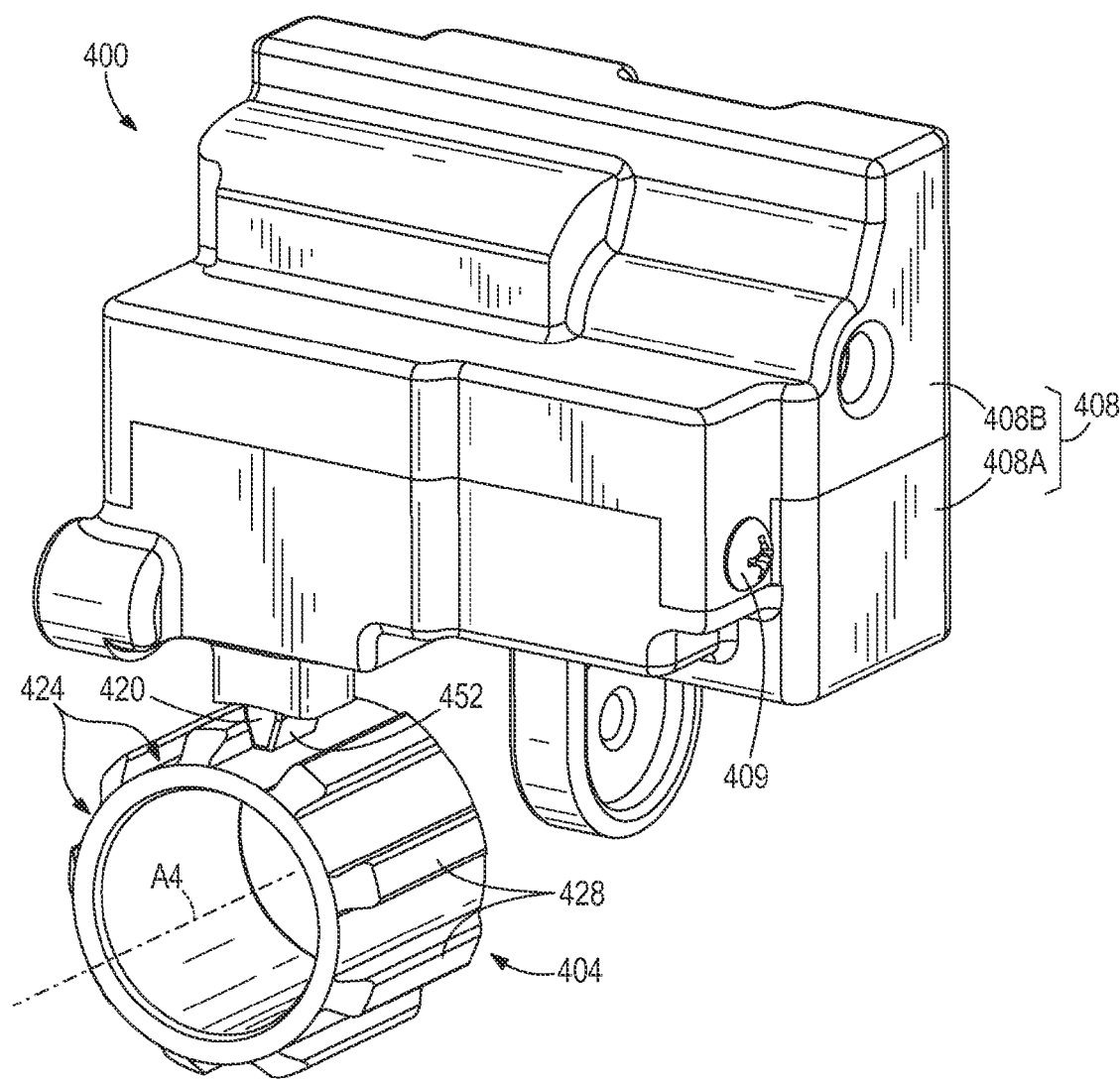
FIG. 13 is a perspective view of a steering lock according to another construction having a passive lockbolt.
Figure 14:
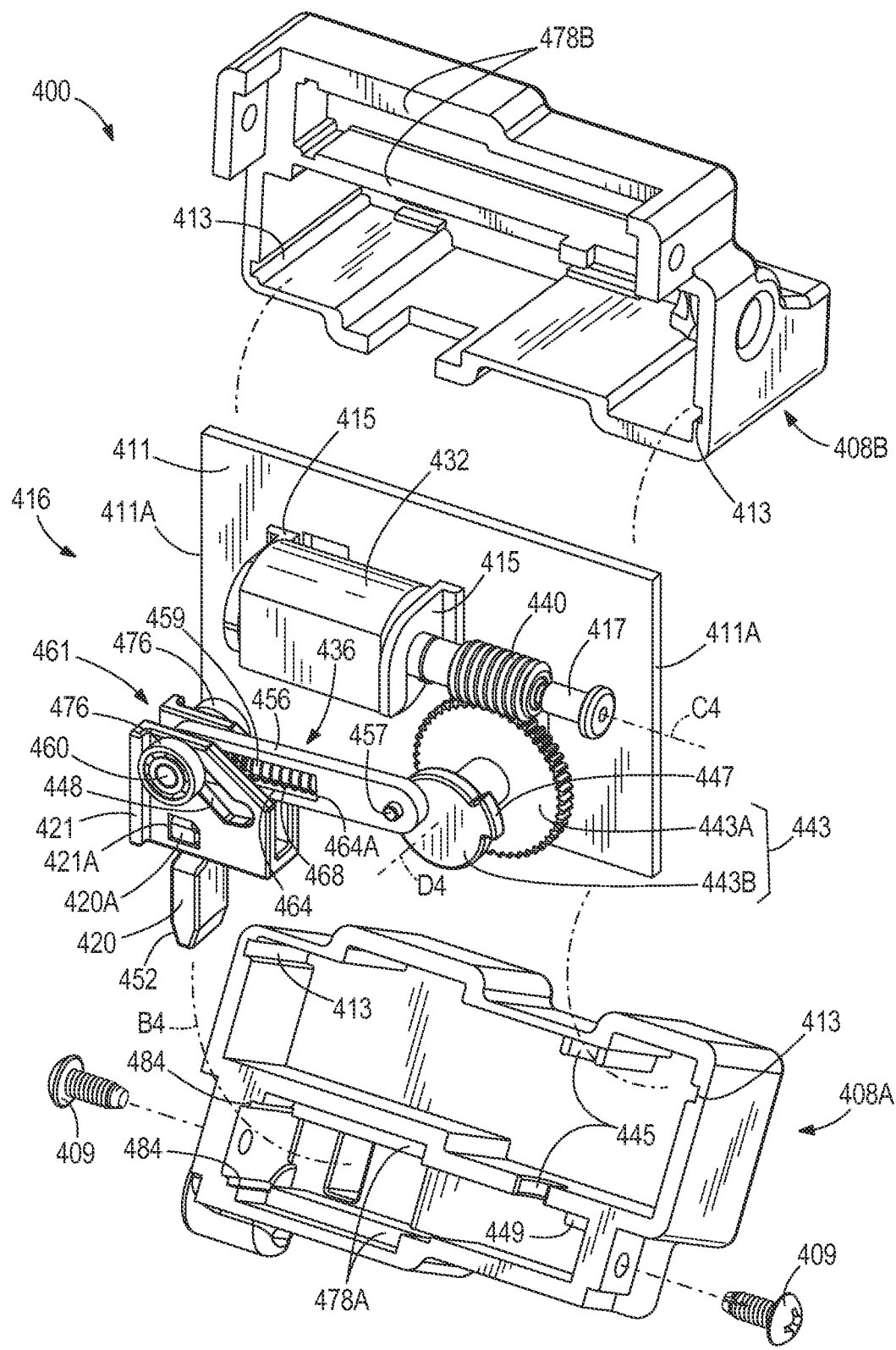
FIG. 14 is a partially exploded assembly view of the steering lock of FIG. 13 in which the housing is removed from the actuation device.
Figure 15:
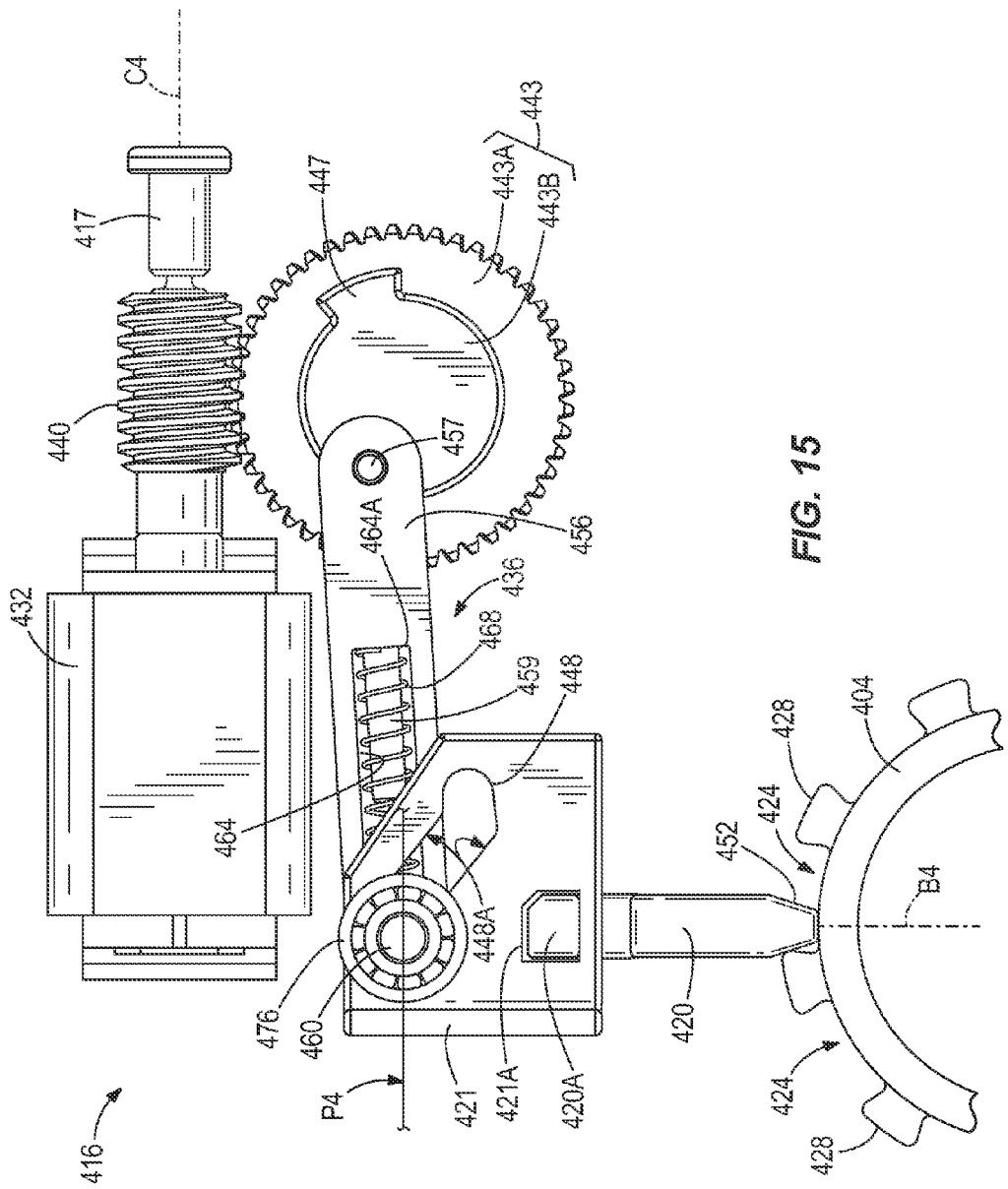
FIG. 15 is front view of the steering lock of FIG. 13 in a locked state.

As shown in FIGS. 13 and 14, the housing 408 includes first and second housing portions 408A, 408B, which in the illustrated construction, are configured as housing halves. The first and second housing portions 408A, 408B are of complementary shape and are coupled together by fasteners 409, which may include threaded fasteners such as the two illustrated screws that are located at overlapping areas of the two housing portions 408A, 408B. Similar to the steering locks described above, the housing 408 is configured to be mounted at a predetermined location proximate a steering member 404, and an actuation device 416 of the steering lock 400 is configured to selectively move a lockbolt 420 out of the housing 408 from a steering member-unlocking position or simply "unlocked" position (FIG. 16) to a steering member-locking position or simply "locked" position (FIG. 15). In the illustrated construction, the lockbolt 420 is movable between the locked and unlocked positions along an axis B4 that is substantially perpendicular to the axis A4 of the steering member 404.

In one construction, the steering member 404 is substantially identical to the ring-shaped steering members 104, 204, 304 described above and includes a plurality of notches or grooves 424 that are elongated parallel to the axis A4, with each adjacent pair of grooves 424 being separated by a rib 428. When the steering lock 400 is locked, the lockbolt 420 is positioned within one of the grooves 424, and interference between the lockbolt 420 and the two adjacent ribs 428 prevents substantial rotation of the steering member 404 about the axis A4. The size, shape, and number of the grooves 424 and the ribs 428 can be varied from the illustrated construction according to the needs of a particular application. It should also be appreciated that the actuation device 416 of the steering lock 400, and any of the others described above, may engage virtually any type of steering member to selectively inhibit the use thereof. For example, the steering member in some constructions may not be tubular or ring-shaped with outwardly-projecting ribs, and may instead have a projection-free outer surface that provides one or more lockbolt-receiving grooves in the form of one or more apertures. One or more ribs for interfering with the lockbolt 420 in such a construction may simply be provided by the material adjacent the aperture(s).

As shown in FIG. 14, each of the housing portions 408A, 408B is configured to receive and support the actuation device 416. A combined actuator mounting plate and printed circuit board (PCB) 411 is jointly received by both housing portions 408A, 408B, with the edges 411A of the mounting plate/PCB 411 being received by channels 413 provided on the interior of the housing portions 408A, 408B. Two actuator mounts 415 are secured to the mounting plate/PCB 411 and support opposing ends of the actuator 432. An additional support 417, which may be a bearing support received by the second housing portion 408B, is provided on the end of the output shaft 440. In some constructions, the PCB 411 may not be configured as a mounting plate for the actuator 432. In such constructions, the actuator 432 may be electrically coupled with the PCB 411 while being positioned by and/or mounted to at least one of the housing portions 408A, 408B.

Turning now to the mechanics of the actuation device 416, certain aspects are generally similar to aspects already described with respect to at least one of the steering locks 100, 200, 300 described above. For example, the actuation device 416 utilizes a shuttle 436 to deploy the lockbolt 420 to the locked position. The shuttle is movable between a blocking position that obstructs movement of the lockbolt 420 to the steering member-unlocking position and a non-blocking position that does not obstruct movement of the lockbolt 420 to the steering member-unlocking position. Furthermore, a lost motion device is provided to store the actuation energy as described above when the lockbolt 420 is actuated to move from the unlocked position to the locked position, but is blocked from immediately achieving the locked position. However, unlike the steering locks 100, 200, 300 described above, the lockbolt 420 of the steering lock 400 is completely passive, as no bias member is provided to urge the lockbolt 420 along the lockbolt axis B4 to one position or the other. The specific construction and operation of the actuation device 416 are explained in detail below.

The actuator 432, which may be an electric motor rated for less than 1.0 amp at maximum load and in some constructions about 500 mA at maximum load, is coupled to the output shaft 440 to rotate the output shaft 440 about the axis C4. In the illustrated construction, the output shaft 440 is constructed as a worm gear that is in meshed engagement with a gear portion 443A of a rotary drive member or crank 443. The gear portion 443A forms a driven portion of the crank 443, and a driving portion 443B is rotationally coupled and axially offset from the gear portion 443A. The crank 443 is configured to rotate about an axis D4 when the output shaft 440 is rotated by the actuator 432. As shown in FIG. 14, a pair of cradles 445 are formed in the first housing portion 408A for supporting the crank 443.

The shuttle 436 is coupled to the crank 443 and configured to apply an actuating force to the lockbolt 420. The shuttle 436 includes a guide body or link 456 coupled to the crank 443 at a pivot 457, and a roller unit coupled to the link 456 through a lost motion device. In the illustrated construction, the roller unit includes a pair of roller bearings 476 mounted on a common axle 460, and the lost motion device includes a biasing member such as a coil spring 468 positioned in an opening or slot 464 of the link 456. As seen in the drawings, a first end of the coil spring 468 may abut a first end 464A of the slot 464 and be retained on a post 459 of the link 456, and the opposing end of the coil spring 468 may abut the axle 460 so that the roller unit is normally kept at a second opposite end of the slot 464. Although one construction of the roller unit is shown, it should be appreciated that many alternate constructions will be apparent to those of skill in the art for providing a rolling interface between the shuttle 436 and the lockbolt 420.

The roller unit is operatively coupled with the lockbolt 420 through a lockbolt carrier 421. The lockbolt carrier 421 includes a central recess 461 that receives a portion of the link 456. The axle 460 of the roller unit extends through a pair of matching cam slots 448 in the lockbolt carrier 421 and through the slot 464 in the link 456, thereby coupling the link 456 with the lockbolt carrier 421. The lockbolt 420 is coupled with the lockbolt carrier 421 by engagement between a protrusion 420A of the lockbolt 420 and an aperture 421A in the lockbolt carrier 421 that enables the lockbolt 420 and the lockbolt carrier 421 to move together unitarily along the lockbolt axis B4. Although provided as separate components in the illustrated construction, the lockbolt 420 and the lockbolt carrier 421 constitute a lockbolt unit and may be replaced in some constructions of the steering lock 400 by a lockbolt unit of alternate construction, such as a one-piece lockbolt that is directly coupled to the shuttle 436.

Both the roller bearings 476 of the roller unit and the lockbolt carrier 421 are guided for linear movement by internal features of the housing 408. Portions of the lockbolt carrier 421 contact a pair of guide surfaces 484 (FIG. 14) on the inside of the first housing portion 408A so that the lockbolt carrier 421 is moved parallel to the lockbolt axis B4 when actuated by the shuttle 436. Furthermore, guide surfaces 478A, 478B on both the first and second housing portions 408A, 408B constrain the movement of the roller unit to a plane P4 that is substantially perpendicular to the lockbolt axis B4. Thus, the roller unit moves perpendicular to the lockbolt axis B4 although the link 456 has the freedom to assume various angular orientations during movement of the crank 443. Because the axle 460 is supported at both its ends by the roller bearings 476, the axle 460 experiences low friction rolling along the surfaces of the cam slots 448 in the lockbolt carrier 421 rather than sliding. Likewise, the outer portions of the roller bearings 476 experience low friction rolling along either pair of the guide surfaces 478A, 478B rather than sliding.

Figure 16:
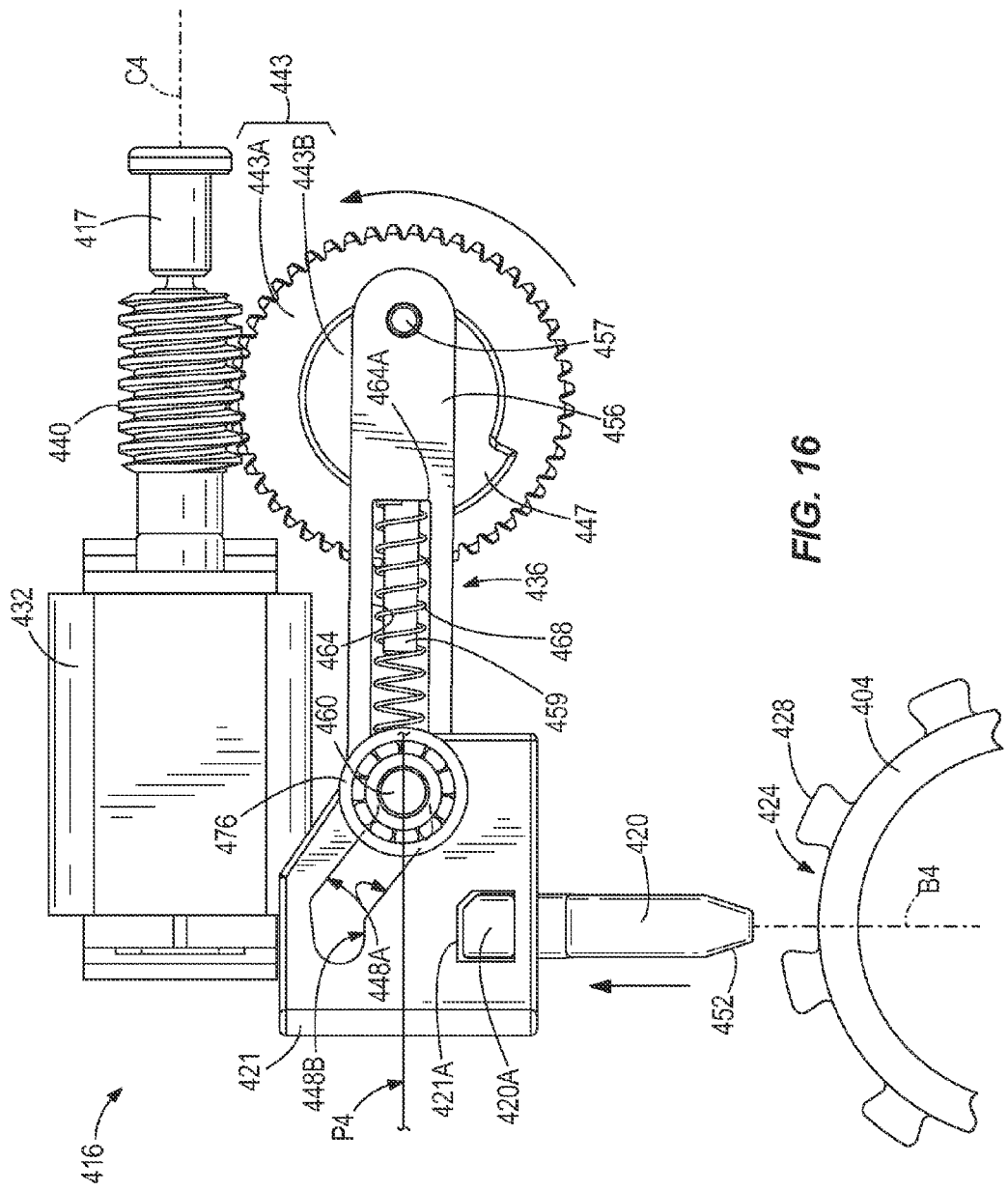
FIG. 16 is a front view of the steering lock of FIG. 13 in an unlocked state.
Figure 17:
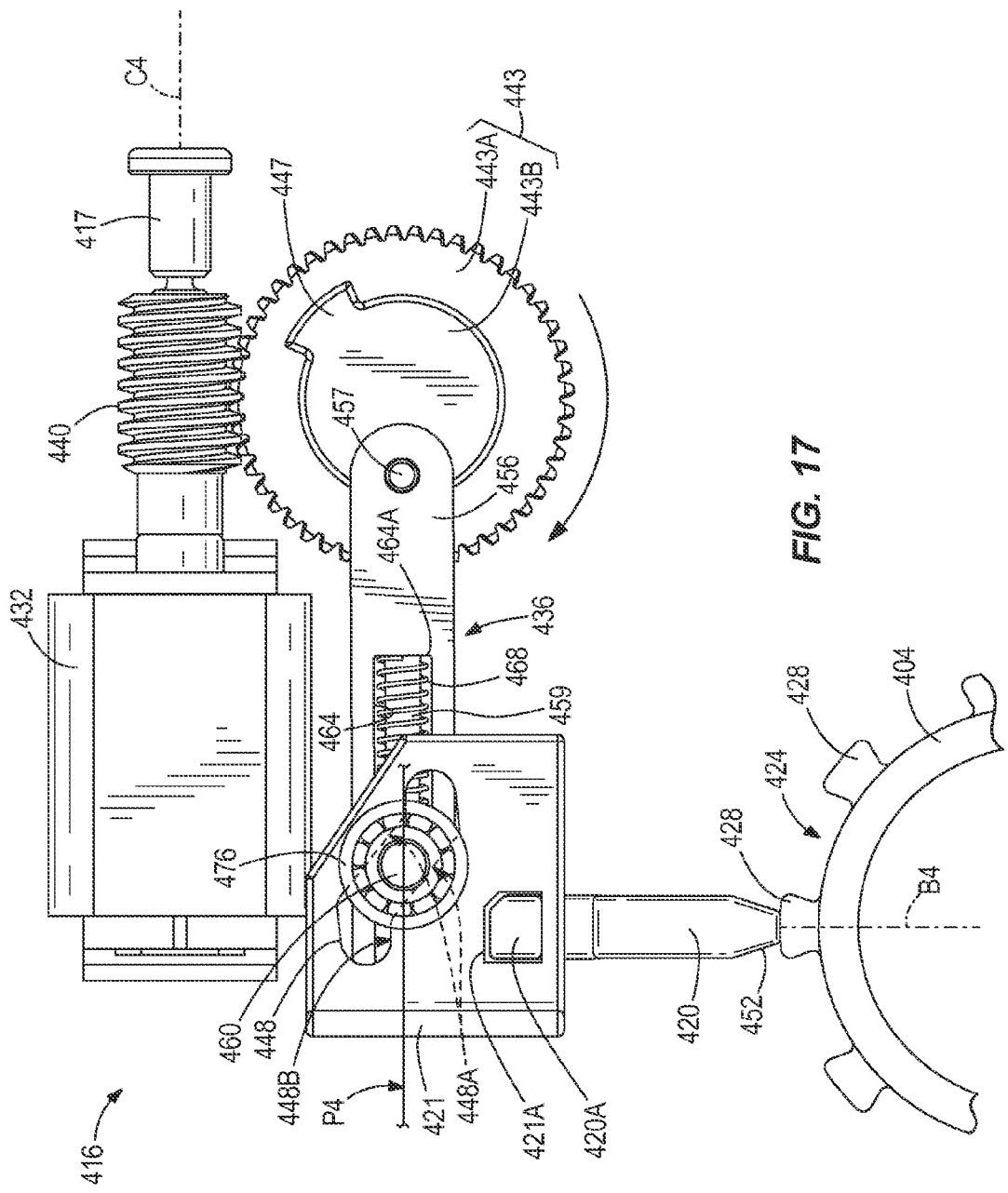
FIG. 17 is a front view of the steering lock of FIG. 13 in a state in which the lockbolt is obstructed from reaching the locked state when actuated.

The operation and various states of the steering lock 400 are described with primary reference to FIGS. 15-17. In FIG. 15, the steering lock 400 is in a locked state, which is to say that the lockbolt 420 is extended along the axis B4 to its locked position so that it is received in one of the grooves 424 of the steering member 404 and rotation of the steering member 404 is inhibited. The roller unit of the shuttle 436 is positioned on surfaces 448B of the cam slots 448 that extend substantially perpendicular to the lockbolt axis B4 to serve as blocking surfaces so that the shuttle 436 blocks or physically obstructs the movement of the lockbolt 420 from the locked position toward the unlocked position of FIG. 16. In the illustrated construction, the blocking surfaces 448B, while extending substantially perpendicular to the lockbolt axis B4, are positioned along the lockbolt axis B4 to intersect with the lockbolt axis B4. Any force applied from the steering member 404 to the lockbolt 420 in the unlocking direction is reacted against simply by contact between the roller bearings 476 and the guide surfaces 478B of the second housing portion 408B, which are substantially perpendicular to the lockbolt axis B4. Such a force from the steering member 404 is unable to backdrive the shuttle 436 or the actuator 432, so that the lockbolt 420 passively but reliably stays in the locked position. No bias force along the lockbolt axis B4 is applied to the lockbolt 420 in the locked position, and no energy or resistance from the actuator 432 is used to keep the lockbolt 420 in the locked position.

To unlock the steering lock 400 and release the steering member 404, the shuttle 436 is moved from the blocking position to the non-blocking position. The actuator 432 is energized to rotate the output shaft 440, which rotates the crank 443 (counter-clockwise as viewed in FIGS. 15-17) to move the link 456. The link 456 is moved so as to pull the roller unit, and particularly the axle 460, off of the blocking surfaces 448B and into portions of the cam slots 448 that are inclined with respect to the lockbolt axis B4 to provide inclined cam surfaces 448A. In the illustrated construction, the cam surfaces 448A of each cam slot 448 are oriented at approximately 45 degrees with respect to the lockbolt axis B4. When the roller unit is pulled by the link 456 away from the blocking surfaces 448B (to the right in FIGS. 15-17), the contact between the axle 460 and the inclined cam surfaces 448A urges the lockbolt carrier 421 and the lockbolt 420 toward the unlocked position of FIG. 16. Although the power of the actuator 432 is applied in a manner to move the lockbolt 420 from the locked position to the unlocked position, the lockbolt 420 is substantially self-releasing due to the configuration of the tapered tip 452, which is similar to the tip 152 described above. Thus, even if a strong force is applied to the lockbolt 420 by the steering member 404, this force tends to automatically release the lockbolt 420 from the steering member 404 rather than wedging the lockbolt 420 and holding it in the locked position against the power of the actuator 432. Therefore, the actuator 432 does not need a high power rating to cope with the extraction of a wedged lockbolt condition.

Movement into the unlocked position is completed when the roller unit reaches a position in the cam slots 448 that is opposite the blocking surfaces 448B as shown in FIG. 16. This position defines the non-blocking position of the shuttle 436. In the illustrated construction, the crank 443 positions the shuttle 436 as remotely as possible from the lockbolt axis B4 in the non-blocking position. The coil spring 468 or other lost motion device holds no residual or potential energy in the unlocked position, and the lockbolt 420 is not subject to any other bias force in the unlocked position such that the actuator 432 can simply be turned off and the lockbolt 420 sits passively in the unlocked position until actuated to lock again. The actuator 432 is automatically stopped upon achieving the unlocked position of FIG. 16. In one construction, a magnetic switch on the mounting plate/PCB 411 may sense the orientation of the crank 443 by sensing a magnet or magnetic portion of the crank 443 to signal the actuator 432 to turn off. Excessive travel of the crank 443 is also blocked by interference between a protrusion 447 on the driving portion 443B of the crank 443 and an abutment 449 on the inside of the first housing portion 408A.

In order to lock the steering lock 400 and restrict movement of the steering member 404, the actuator 432 is energized to rotate the output shaft 440, which rotates the crank 443 (clockwise as viewed in FIGS. 15-17) to move the link 456. The link 456 is moved so as to push the roller unit, and particularly to push the axle 460 via the coil spring 468 or other lost motion device, along the inclined cam surfaces 448A toward the blocking surfaces 448B. Because the roller unit is constrained to move within the plane P4, the movement of the roller unit toward the blocking surfaces 448B (to the left as viewed in FIGS. 15-17), causes the lockbolt carrier 421 and the lockbolt 420 to move along the axis B4 toward the steering member 404. The actuator 432 is automatically stopped upon actuating the crank 443 an amount corresponding to that required for actuating the lockbolt 420 to the locked position via the shuttle 436. Various types of open-loop or closed-loop controls may be used to control on/off operation of the actuator 432. In some constructions, a magnetic switch on the mounting plate/PCB 411 may sense the orientation of the crank 443 by sensing a magnet or magnetic portion of the crank 443 to signal the actuator 432 to turn off. As shown in FIG. 15, the crank 443 may be rotated just past a top dead center position (in which the link 456 and the coil spring 468 intersect with the crank axis D4) so that any residual or potential energy stored in the spring 468 in the locked position urges the crank 443 to rotate further clockwise. Excessive travel of the crank 443 in this direction is blocked by interference between the protrusion 447 on the driving portion 443B of the crank 443 and the abutment 449 on the inside of the first housing portion 408A. Thus, the locked position is stable without continued energization of the actuator 432, and although a slight bias force may exist within the shuttle 436 (e.g., in the spring 468 or other lost motion device between the link 456 and the roller unit), the lockbolt 420 and the lockbolt carrier 421 are not biased in either direction along the lockbolt axis B4 when in the locked position. Although illustrated in FIG. 15 as rotating slightly past top dead center, the crank 443 may stop substantially at top dead center to provide a stable locked position that is resistant to backdriving by the link 456.

The above description of locking the steering member 404 by moving the lockbolt 420 to the locked position assumes that the lockbolt 420 is aligned with a groove 424 of the steering member 404 when actuated. As such, the lost motion device transfers the actuating energy from the actuator to the roller unit and to the lockbolt 420, substantially without absorbing such energy. However, it may not always be the case that the lockbolt 420 is aligned with a groove 424 of the steering member 404 when actuated. Similar to the steering locks 100, 200, 300 described above, the shuttle 436 of the steering lock 400 of FIGS. 13-17 is configured to store energy supplied by the actuator 432 when the shuttle 436 is actuated to move the lockbolt 420 and the lockbolt 420 abuts a rib 428 of the steering member 404. When these circumstances arise in the illustrated construction, the actuator 432 moves the guide body or link portion 456 of the shuttle 436 to the position corresponding to the lockbolt-blocking position, but the roller unit does not achieve the blocking position. Instead, the coil spring 468 is compressed between the axle 460 of the roller unit and the end 464A of the slot 464 as shown in FIG. 17. The energy supplied by the actuator 432 is stored by the coil spring 468, and the actuator 432 is turned off. Although shown in the top dead center position in FIG. 17, the link 456 may be rotated slightly past top dead center (further clockwise as viewed in FIGS. 15-17) as described above with respect to the normal locking position. Because the crank 443 and the link 456 are stable in this position and do not need to be actively maintained by the actuator 432, the steering lock 400 can remain in this imminent-lock position without any significant power draw (i.e., no power to the actuator 432, and only nominal power to the associated circuit which may be used to maintain active sensors or the like) and without reaching a fault condition. From the state shown in FIG. 17, the lockbolt 420 will move to the locked position by the energy stored in the lost motion device as soon as the steering member 404 is moved to align a groove 424 with the lockbolt 420.

FIGS. 18-22 illustrate a steering lock 500 according to yet another construction. The steering lock 500 of FIGS. 18-22 is similar in some aspects to the steering locks 100, 200, 300, 400 of FIGS. 1-17. Reference characters, with leading digits incremented by 100, are re-used where appropriate for consistency. Reference is made to the above description of the steering locks 100, 200, 300, 400 for features and aspects of the steering lock 500 of FIGS. 18-22 not specifically described below.

Figure 18:
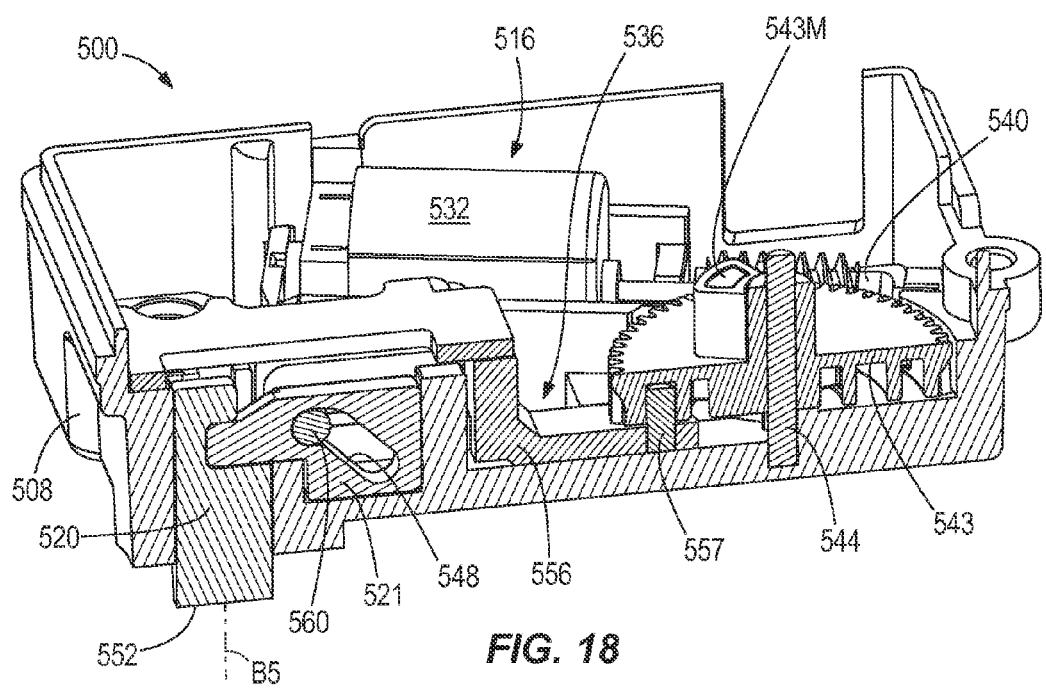
FIG. 18 is a cross-sectional view of a steering lock according to another construction.
Figure 19:
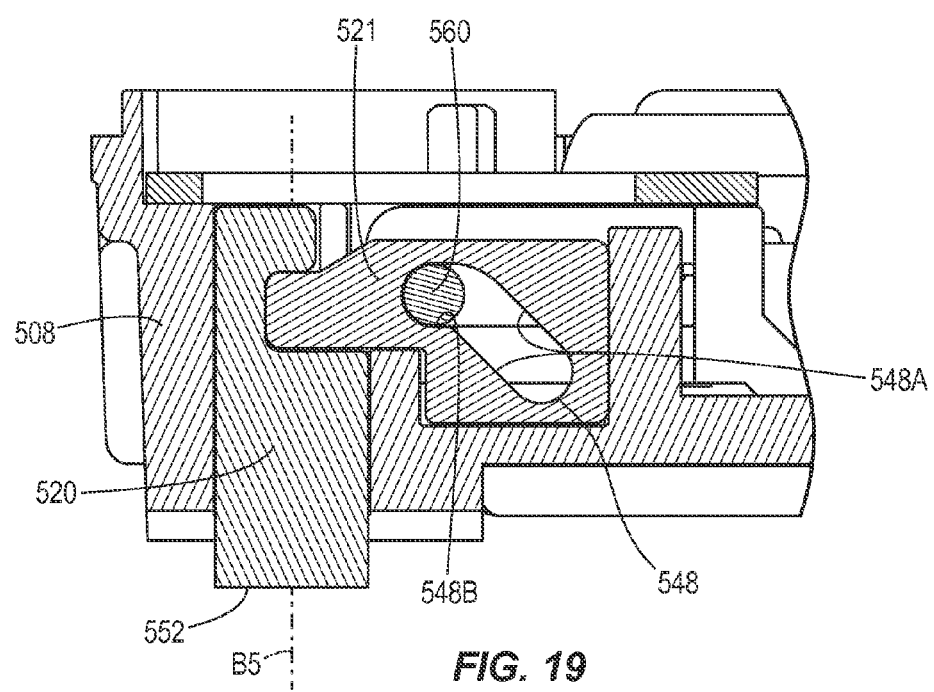
FIG. 19 is a detail cross-sectional view of a lockbolt and shuttle of the steering lock of FIG. 18.
Figure 20:
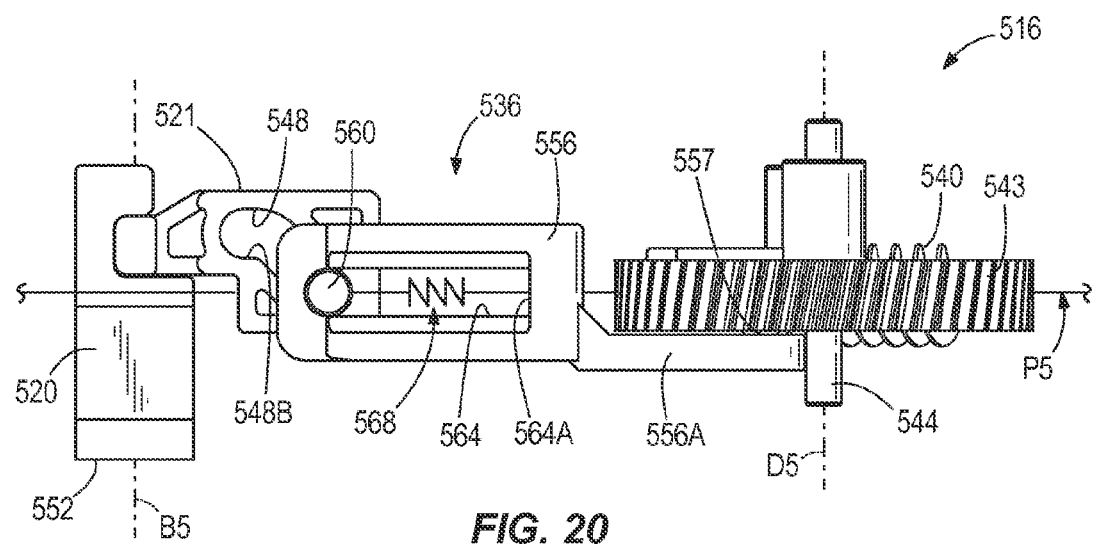
FIG. 20 is a side view of an actuation mechanism of the steering lock of FIG. 18, shown in the unlocked state.
Figure 21:
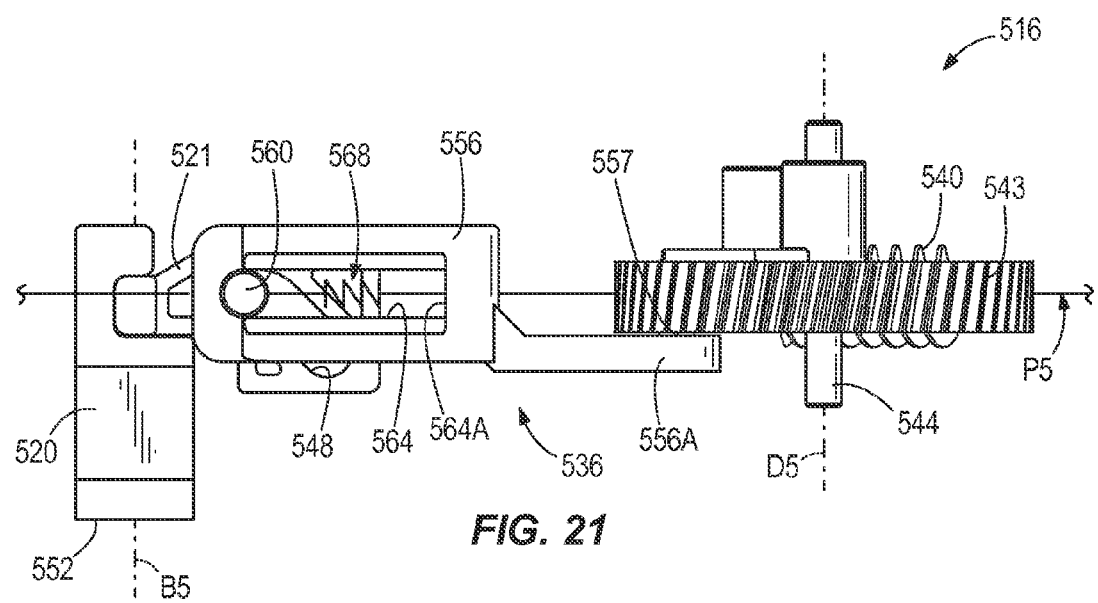
FIG. 21 is a side view of the actuation mechanism of the steering lock of FIG. 18, shown in the locked state.

As shown in FIGS. 18 and 19, a housing 508 encloses an actuation device 516 for actuating a lockbolt 520. Although only a portion of the housing 508 is shown, it should be understood that the housing 508 can include first and second portions similar to housings shown in other figures and described above. Similar to the steering locks described above, the housing 508 is configured to be mounted at a predetermined location proximate a steering member (not shown), and the actuation device 516 of the steering lock 500 is configured to selectively move the lockbolt 520 out of the housing 508 from a steering member-unlocking position or simply "unlocked" position (FIG. 20) to a steering member-locking position or simply "locked" position (FIGS. 18, 19, and 21). In the illustrated construction, the lockbolt 520 is movable between the locked and unlocked positions along an axis B5 that is substantially perpendicular to an axis of the steering member.

Turning now to the mechanical construction of the actuation device 516, certain aspects are generally similar to aspects already described with respect to at least one of the steering locks 100, 200, 300, 400 described above. For example, the actuation device 516 utilizes a shuttle 536 to deploy the lockbolt 520 to the locked position. The shuttle 536 is movable between a blocking position that obstructs movement of the lockbolt 520 to the steering member-unlocking position and a non-blocking position that does not obstruct movement of the lockbolt 520 to the steering member-unlocking position. Furthermore, a lost motion device is provided to store the actuation energy when the lockbolt 520 is actuated to move from the unlocked position to the locked position, but is blocked (e.g., when aligned with a rib of the steering member rather than a groove) from immediately achieving the locked position. Similar to the steering lock 400, the steering lock 500 is completely passive, as no bias member is provided to urge the lockbolt 520 along the lockbolt axis B5 to one position or the other. The specific construction and operation of the actuation device 516 are explained in detail below.

The actuator 532, which may be an electric motor, is coupled to the output shaft 540 to rotate the output shaft 540 about the axis C5. In the illustrated construction, the output shaft 540 is constructed as a worm gear that drives a crank or rotary drive member 543, e.g., via a meshing engagement with a gear portion 543A at the outer periphery of the rotary drive member 543, such that the rotary drive member 543 is drivable by the actuator 532. The rotary drive member 543 also includes a driving portion 543B radially inward of the gear portion 543A. The rotary drive member 543 is configured to rotate about an axis D5 when the output shaft 540 is rotated by the actuator 532. Unlike the crank 443 of the steering lock 400, the axis D5 is substantially parallel to the lockbolt axis B5 such that the rotary drive member 543 rotates in a plane P5 that is substantially perpendicular to the lockbolt axis B5. However, the rotary drive member 543 can have another orientation relative to the lockbolt axis B5, for example, similar to the crank 443 and lockbolt 420 if desired. A pin or axle 544 rotatably supports the rotary drive member 543 relative to the housing 508. As described further below, the driving portion 543B of the rotary drive member 543 is a cam.

The shuttle 536 is coupled to the rotary drive member 543 and configured to apply an actuating force to the lockbolt 520. The shuttle 536 includes a guide body or link 556 coupled to the rotary drive member 543 via a follower 557 and a lockbolt actuator coupled to the link 556 through a lost motion device. Although not illustrated in detail, the lockbolt actuator can be a roller unit similar to that described above with respect to the steering lock 400. The lockbolt actuator can include a pin or axle 560, and the lost motion device includes a biasing member such as a coil spring 568 positioned in an opening or slot 564 of the link 556. As seen in the drawings, a first end of the coil spring 568 may abut a first end 564A of the slot 564, and the opposing end of the coil spring 568 may abut the axle 560 so that the pin 560 is normally kept at a second opposite end of the slot 564. Although illustrated schematically in FIGS. 20 and 21, it should be appreciated that the spring 568 may be constructed and retained similar to that of the steering lock 400.

Figure 22:
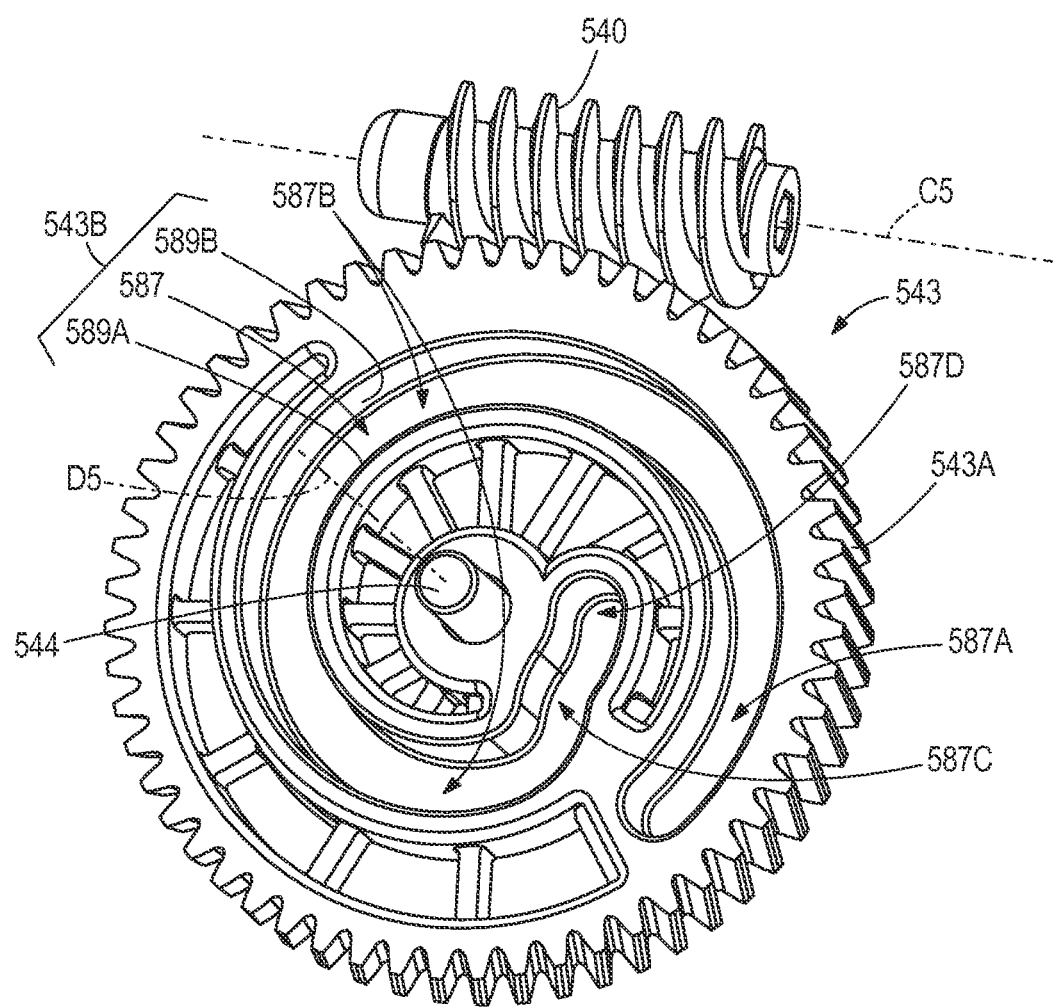
FIG. 22 is a perspective view of an output shaft and crank of the actuation mechanism.

A portion of the link 556 having the slot 564 is substantially co-planar with the rotary drive member 543, and the axle 560 is constrained by the housing 508 to travel linearly within a plane, which is parallel to or the same as the plane P5 in which the rotary drive member 543 rotates. The link 556 is provided with an offset portion 556A carrying the follower 557 as shown in FIGS. 20 and 21 to engage the cam driving portion 543B of the rotary drive member 543. The cam driving portion 543B of the rotary drive member 543 is provided as a spiral cam (e.g., spiral cam groove 587 bounded by inner and outer walls 589A, 589B as shown in FIG. 22). The spiral cam groove 587 can include several distinct segments as shown. A first segment 587A is provided as a radially outermost portion and is a substantially uniform radius dwell segment, the passage of which causes substantially no actuation of the follower 557 and thus, no movement of the shuttle 536. Extending from the first segment 587A in the counter-clockwise direction in FIG. 22 is a second segment 587B, which is a spiral segment of substantially uniformly-decreasing radius. The second segment 587B forms a majority of the groove 587, the passage of which causes substantially fixed-speed translation of the follower 557 and the shuttle 536. Extending from the second segment 587B in the counter-clockwise direction in FIG. 22 is a third segment 587C. The third segment 587C extends further radially inward over a short angular length to provide a more drastic movement of the follower 557 and the shuttle 536 (e.g., faster movement, assuming equivalent angular velocity of the rotary drive member 543). The furthest radially inward segment 587D is a fourth segment provided as a dwell segment with substantially uniform radius.

The shuttle 536 is operatively coupled with the lockbolt 520 through a lockbolt carrier 521 similar to the above description of the steering lock 400. The lockbolt 520 and the lockbolt carrier 521 are secured to move unitarily together. Although provided as separate components in the illustrated construction, the lockbolt 520 and the lockbolt carrier 521 constitute a lockbolt unit and may be replaced in some constructions of the steering lock 500 by a lockbolt unit of alternate construction, such as a one-piece lockbolt that is directly coupled to the shuttle 536. The axle 560 in the slot 564 in the link 556 extends through a cam slot(s) 548 in the lockbolt carrier 521, thereby coupling the link 556 with the lockbolt carrier 521.

Unlike the link 456 of the steering lock 400 which has the freedom to assume various angular orientations during movement of the actuating crank 443, the link 556 (and thus, the shuttle 536 as a whole) is guided for linear movement relative to the housing 508. The lockbolt carrier 521 is also guided for linear movement by internal features of the housing 508 such that the lockbolt carrier 521 is moved parallel to the lockbolt axis B5 when actuated by the shuttle 536.

The operation and various states of the steering lock 500 are described with primary reference to FIGS. 19-21. In FIGS. 19 and 21, the steering lock 500 is in a locked state, which is to say that the lockbolt 520 is extended along the axis B5 to its locked position so that it is received in one of the grooves of the steering member and rotation of the steering member is inhibited. The axle 560 of the shuttle 536 is positioned on surface(s) 548B of the cam slot(s) 548 that extend substantially perpendicular to the lockbolt axis B5 to serve as blocking surfaces so that the shuttle 536 blocks or physically obstructs the movement of the lockbolt 520 from the locked position toward the unlocked position of FIG. 20. In the illustrated construction, the blocking surfaces 548B are offset from the lockbolt axis B5 in the direction of the shuttle 536 and the rotary drive member 543. Any force applied from the steering member to the lockbolt 520 in the unlocking direction is reacted against simply by the axle 560 and corresponding supports within the housing 508, which are substantially perpendicular to the lockbolt axis B5. The reaction may also be borne by one or more roller bearings provided on the axle 560 to guide the axle 560 along the housing supports. Such a force from the steering member is unable to backdrive the shuttle 536 or the actuator 532, so that the lockbolt 520 passively but reliably stays in the locked position. No bias force along the lockbolt axis B5 is applied to the lockbolt 520 in the locked position, and no energy or resistance from the actuator 532 is used to keep the lockbolt 520 in the locked position. The follower 557 is positioned within the first segment 587A of the spiral cam groove 587 when the steering lock 500 is in the locked state.

To unlock the steering lock 500 and release the steering member, the shuttle 536 is moved from the blocking position to the non-blocking position. In order to move the shuttle 536, the actuator 532 is energized to rotate the output shaft 540, which rotates the rotary drive member 543 clockwise as shown in FIG. 22 so that the follower 557 enters the second segment 587B of the spiral cam groove 587. As the rotary drive member 543 rotates through the angle of the second segment 587B, the follower 557 and the link 556 are driven linearly at a substantially fixed ratio with the angular rotation of the drive member 543. The link 556 is moved so as to pull the axle 560 off of the blocking surface(s) 548B and into portions of the cam slots 548 that are inclined with respect to the lockbolt axis B5 to provide inclined cam surfaces 548A (FIG. 19). In the illustrated construction, the cam surface(s) 548A is oriented at approximately 45 degrees with respect to the lockbolt axis B5. When the axle 560 is pulled by the link 556 away from the blocking surface(s) 548B, the contact between the axle 560 and the inclined cam surface 548A urges the lockbolt carrier 521 and the lockbolt 520 toward the unlocked position. Although the power of the actuator 532 is applied in a manner to move the lockbolt 520 from the locked position to the unlocked position, the lockbolt 520 is substantially self-releasing due to the configuration of the tapered tip 552 (not visible in drawings—tapered in the direction into and out of the page as shown), which is similar to the tip 152 described above. Thus, even if a strong force is applied to the lockbolt 520 by the steering member, this force tends to automatically release the lockbolt 520 from the steering member rather than wedging the lockbolt 520 and holding it in the locked position against the power of the actuator 532. Therefore, the actuator 532 does not need a high power rating to cope with the extraction of a wedged lockbolt condition.

Once the lockbolt 520 is mostly or fully removed from engagement with the steering member, the follower 557 passes through the third segment 587C of the spiral cam groove 587, by which the follower 557 is moved at an accelerated ratio with respect to the angular rotation of the rotary drive member 543. This enables the lockbolt 520 to more quickly reach the unlocked position, when the actuator 532 is substantially unloaded.

Movement into the unlocked position is completed when the follower 557 passes into the fourth segment 587D of the spiral cam groove 587, which corresponds to the axle 560 reaching a position in the cam slot(s) 548 that is opposite the blocking surface 548B as shown in FIG. 20. This position defines the non-blocking position of the shuttle 536. In the illustrated construction, the rotary drive member 543 positions the shuttle 536 as remotely as possible from the lockbolt axis B5 in the non-blocking position. The coil spring 568 or other lost motion device holds no residual or potential energy in the unlocked position, and the lockbolt 520 is not subject to any other bias force in the unlocked position such that the actuator 532 can simply be turned off and the lockbolt 520 sits passively in the unlocked position until actuated to lock again. The actuator 532 is automatically stopped upon achieving the unlocked position of FIG. 20. In one construction, a magnetic switch may sense the orientation of the rotary drive member 543 by sensing a magnet 543M or magnetic portion of the rotary drive member 543 (FIG. 18) to signal the actuator 532 to turn off.

In order to lock the steering lock 500 and restrict movement of the steering member, the actuator 532 is energized to rotate the output shaft 540, which rotates the rotary drive member 543 to move the link 556. The link 556 is moved so as to push the axle 560 via the coil spring 568 or other lost motion device, along the inclined cam surfaces 548A toward the blocking surface 548B. Because the axle 560 is constrained to move within the plane P5, the movement of the axle 560 toward the blocking surface 548B (to the left as viewed in FIGS. 19-21), causes the lockbolt carrier 521 and the lockbolt 520 to move along the axis B5 toward the steering member. The actuator 532 is automatically stopped upon actuating the rotary drive member 543 an amount corresponding to that required for actuating the lockbolt 520 to the locked position via the shuttle 536. Various types of open-loop or closed-loop controls may be used to control on/off operation of the actuator 532. In some constructions, a magnetic switch may sense the orientation of the rotary drive member 543 by sensing the magnet 543M or magnetic portion of the rotary drive member 543 to signal the actuator 532 to turn off.

As the actuator 532 is operated to rotate the rotary drive member 543 and lock the steering lock 500, the follower 557 is driven through the spiral cam groove 587 from the fourth segment 587D toward the first segment 587A. This produces a sequence including a short dwell, a quick initial movement, a more gradual movement over a majority of the rotation, and a final dwell. Due to the constant radius of the first segment 587A of the spiral cam groove 587, as well as the engagement between the gear portion 543A and the worm gear 540, the locked position is stable without continued energization of the actuator 532. Although a slight bias force may exist within the shuttle 536 (e.g., in the spring 568 or other lost motion device between the link 556 and the axle 560), the lockbolt 520 and the lockbolt carrier 521 are not biased in either direction along the lockbolt axis B5 when in the locked position.

The above description of locking the steering member by moving the lockbolt 520 to the locked position assumes that the lockbolt 520 is aligned with a groove of the steering member when actuated. As such, the lost motion device transfers the actuating energy from the actuator to the axle 560 and to the lockbolt 520, substantially without absorbing such energy. However, it may not always be the case that the lockbolt 520 is aligned with a groove of the steering member when actuated, and in these instances, the shuttle 536 operates similar to those described above to store energy supplied by the actuator 532 when the shuttle 536 is actuated to move the lockbolt 520 and the lockbolt 520 abuts a rib of the steering member. The rotary drive member 543 is rotated to a position corresponding to the locked position, but the axle 560, the lockbolt carrier 521, and the lockbolt 520 are not moved. The energy supplied by the actuator 532 is instead stored by the coil spring 568. Because the rotary drive member 543 and the link 556 are stable in this position and do not need to be actively maintained by the actuator 532, the steering lock 500 can remain in this imminent-lock position without any significant power draw (i.e., no power supplied to the actuator 532, and only nominal power to the associated circuit which may be used to maintain active sensors or the like) and without reaching a fault condition. From this state, the lockbolt 520 will move to the locked position by the energy stored in the lost motion device as soon as the steering member is moved to align a groove with the lockbolt 520.

Figure 23:
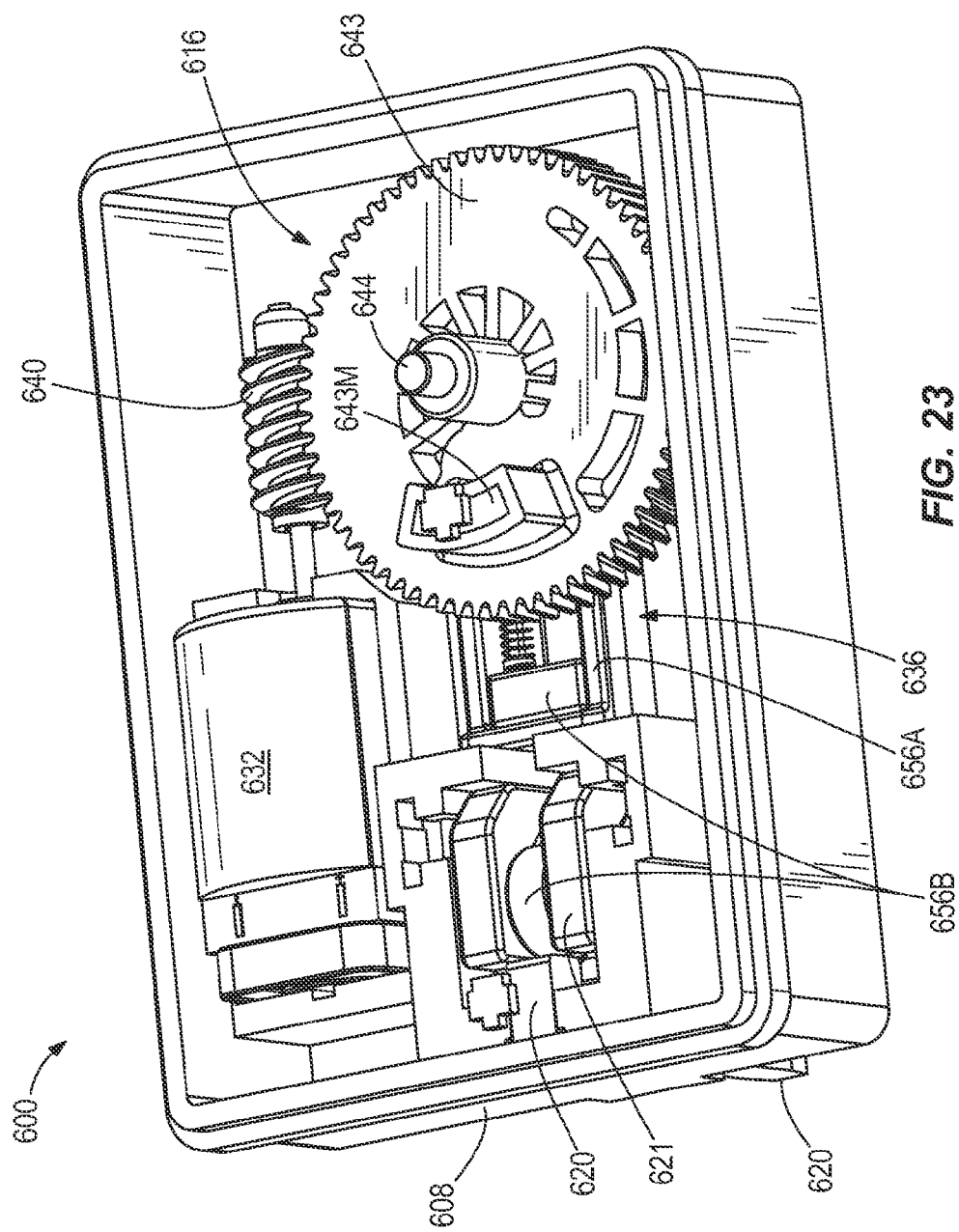
FIG. 23 is a perspective view of a steering lock according to another construction.
Figure 24:
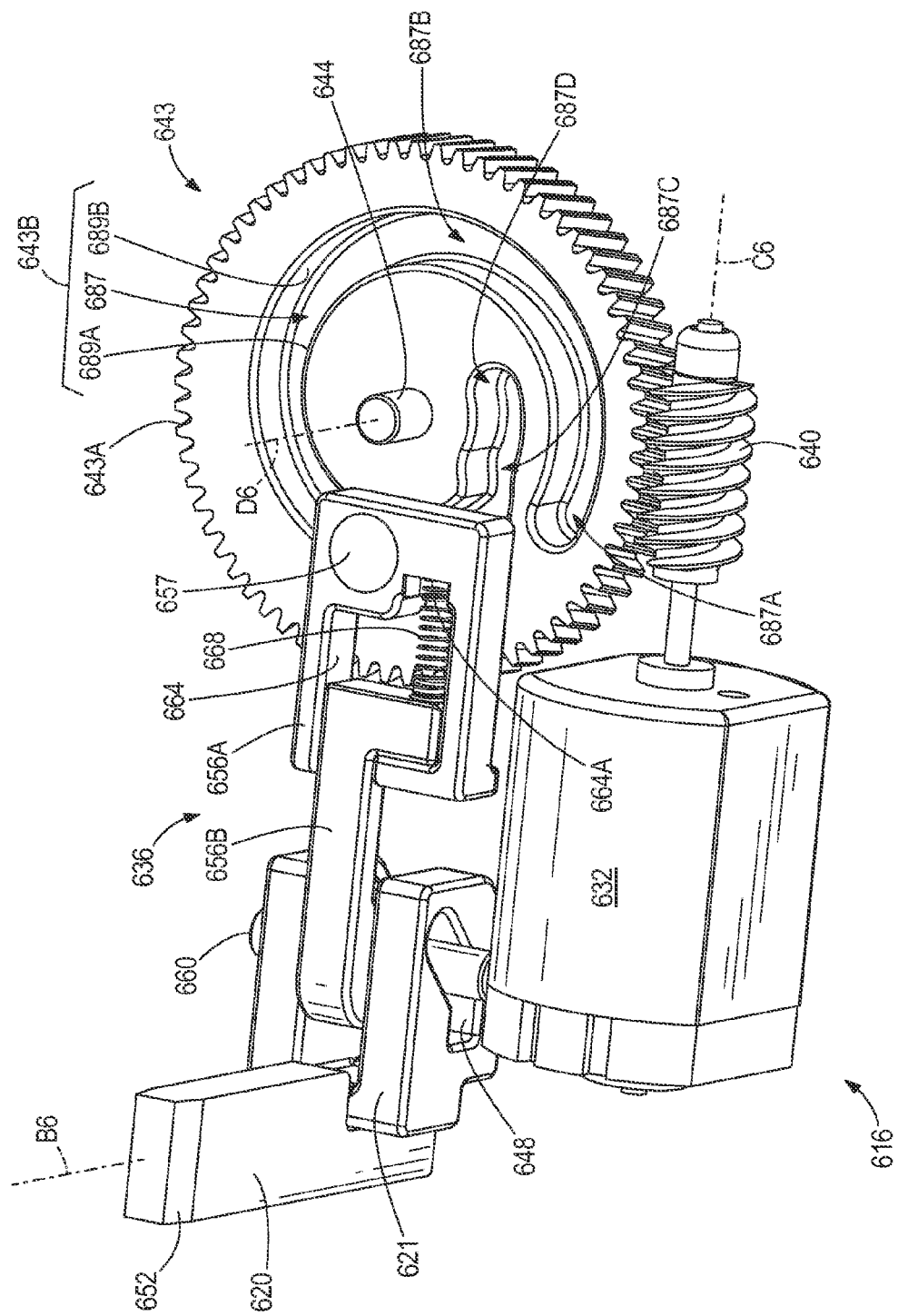
FIG. 24 is a perspective view of an actuation mechanism of the steering lock of FIG. 23.

FIGS. 23 and 24 illustrate a steering lock 600 and actuation device 616 according to yet another construction. The steering lock 600 of FIG. 23, including the actuation device 616 of FIG. 24, is similar in some aspects to the steering locks 100, 200, 300, 400, 500 of FIGS. 1-22. Reference characters, with leading digits incremented by 100, are re-used where appropriate for consistency. Reference is made to the above description of the steering locks 100, 200, 300, 400, 500 for features and aspects of the steering lock 600 and actuation device 616 of FIGS. 23 and 24 not specifically described below.

The steering lock 600 of FIG. 23 features an actuation device 616 as best shown in FIG. 24 that includes a rotary drive member 643 that is similar to the rotary drive member 543 shown in FIG. 22, and includes an outer gear portion 643A and a radially inward driving portion 643B provided as a spiral cam (e.g., spiral cam groove 687 bounded by inner and outer walls 689A, 689B). The spiral cam groove 687 includes several differently shaped portions 687A-D, which can be similar to those of the cam groove 587 and can function in a similar manner. Although the rotary drive member 643 generally actuates the lockbolt 620 through a shuttle 636 with a lost motion device (e.g., spring 668), and with the shuttle 636 being restrained (e.g., by corresponding guide features in the housing 608) to move back and forth along a linear path similar to the shuttle 536 of FIGS. 18-21, the shuttle 636 has a different construction than the shuttle 536.

Rather than the one-piece guide body or link 556, the guide body or link is formed from two separate link members 656A, 656B slidably coupled together. The sliding interface can be defined as a male-female interface. In the illustrated construction, the first link member 656A (closest to the rotary drive member 643) forms a female component, and the second link member 656B forms a male component. The first link member 656A includes a slot or opening 664, and a portion of the second link member 656B is positioned within the opening 664 in the first link member 656A. The spring 668 or other lost motion device is positioned substantially within the opening 664 between the two link members 656A, 656B to bias them to an extended-apart configuration as shown in FIG. 24. In the extended-apart configuration, the spring 668 bears against a first end 664A of the opening 664 and biases the second link member 656B into abutting contact with an opposite end of the opening 664. Either or both of the link members 656A, 656B can include a spring retainer feature to maintain the spring 668 in a desired position or orientation. The axle 660 or other member movable into and out of blocking relationship with the lockbolt 620 is fixed to the second link member 656B to move directly therewith.

Another difference between the steering lock 600 and the steering lock 500 of FIGS. 18-22 is the orientation of the actuator 632. As shown in the drawings, the axis C6 of the worm gear output shaft 640 is substantially parallel with the linear path of the shuttle 636, whereas the axis C5 is substantially skewed with respect to the linear path of the shuttle 536. Both constructions represent viable solutions, and the optimum orientation of these and other components generally depends upon several factors that can include the desired gear ratio, the size of the actuator, and the size and shape of the available packaging space for the steering lock within a particular vehicle.

FIGS. 25-33 illustrate a steering lock 700 and actuation device 716 according to yet another construction. The steering lock 700, including the actuation device 716 of FIGS. 27-33, is similar in some aspects to the steering locks 100, 200, 300, 400, 500, 600 of FIGS. 1-24. Reference characters, with leading digits incremented by 100, are re-used where appropriate for consistency. Reference is made to the above description of the steering locks 100, 200, 300, 400, 500, 600 for features and aspects of the steering lock 700 and actuation device 716 of FIGS. 25-33 not specifically described below.

Figure 25:
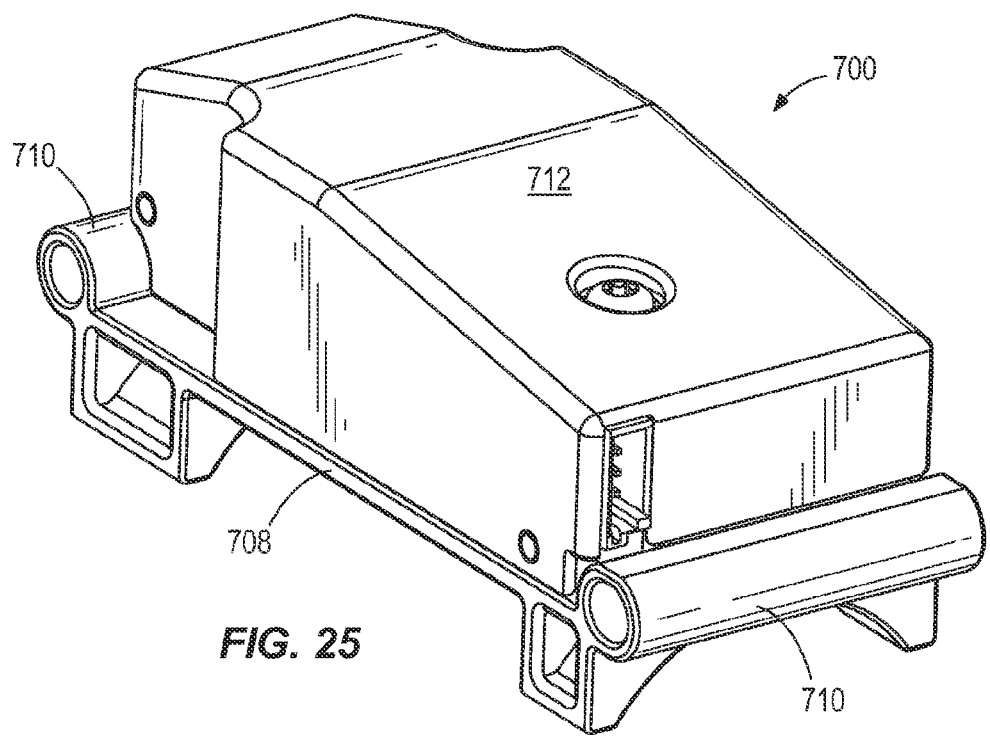
FIG. 25 is a perspective view of a steering lock according to another construction.
Figure 26:
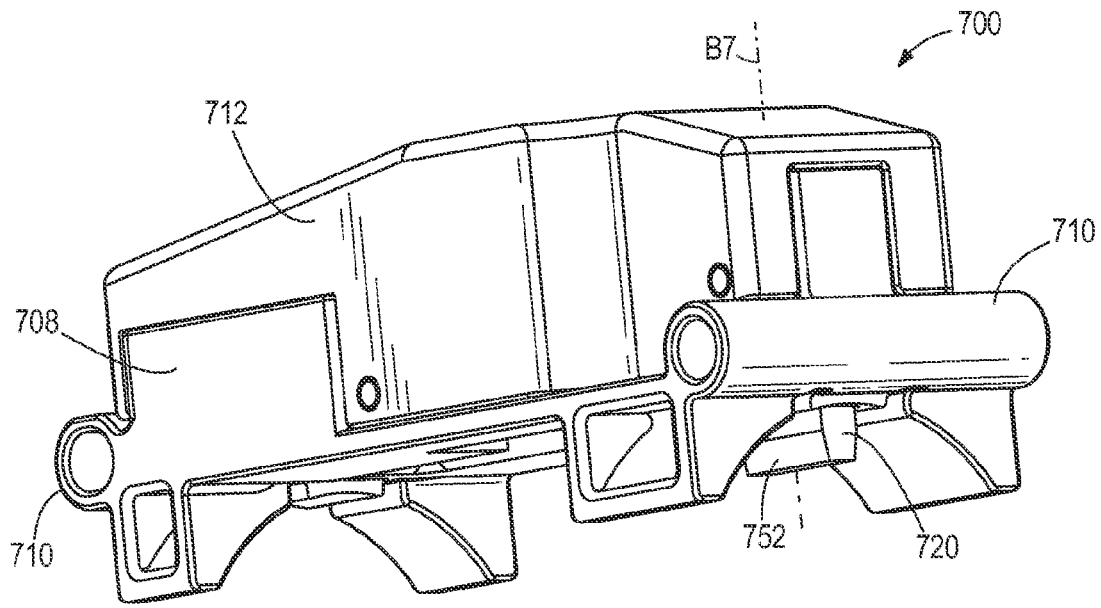
FIG. 26 is an alternate perspective view of the steering lock of FIG. 25.
Figure 27:
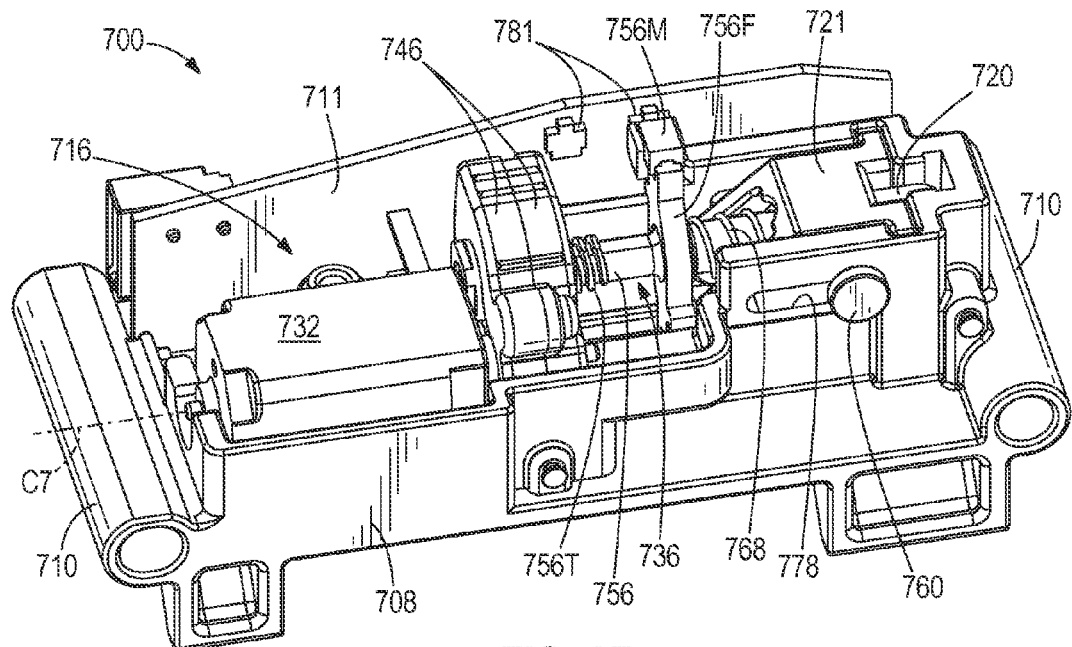
FIG. 27 is a perspective view of the steering lock of FIGS. 25-26 with a cover portion of the housing removed to illustrate the actuation mechanism therein.
Figure 28:
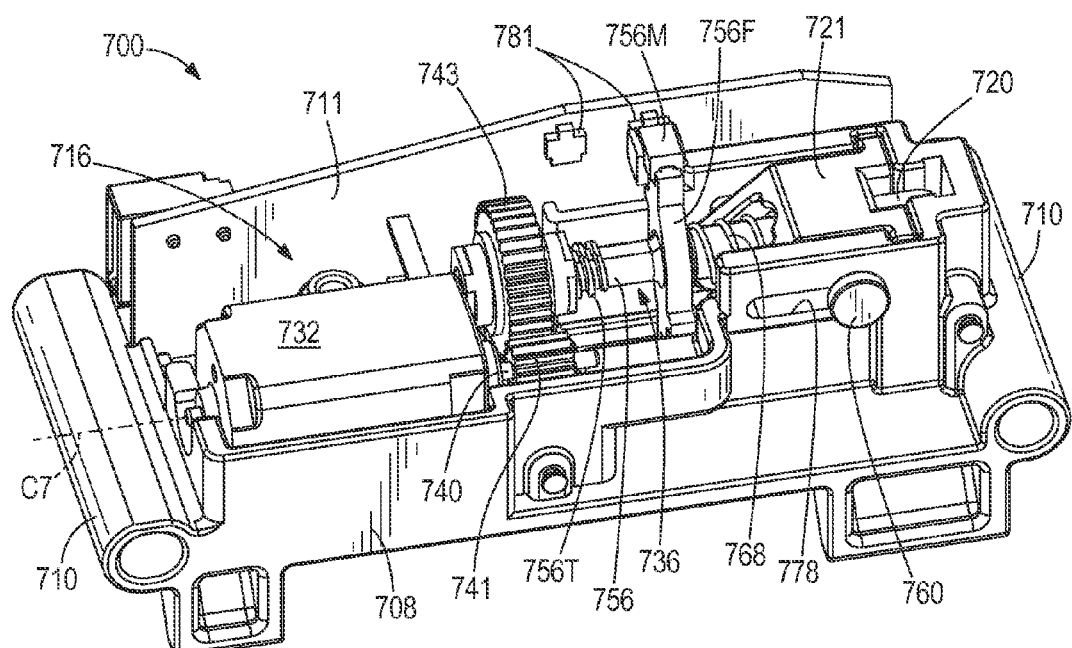
FIG. 28 is a perspective view identical to FIG. 27, but having a gearbox sub-housing removed to illustrate a gear train. The lockbolt is in the locked state.
Figure 29:
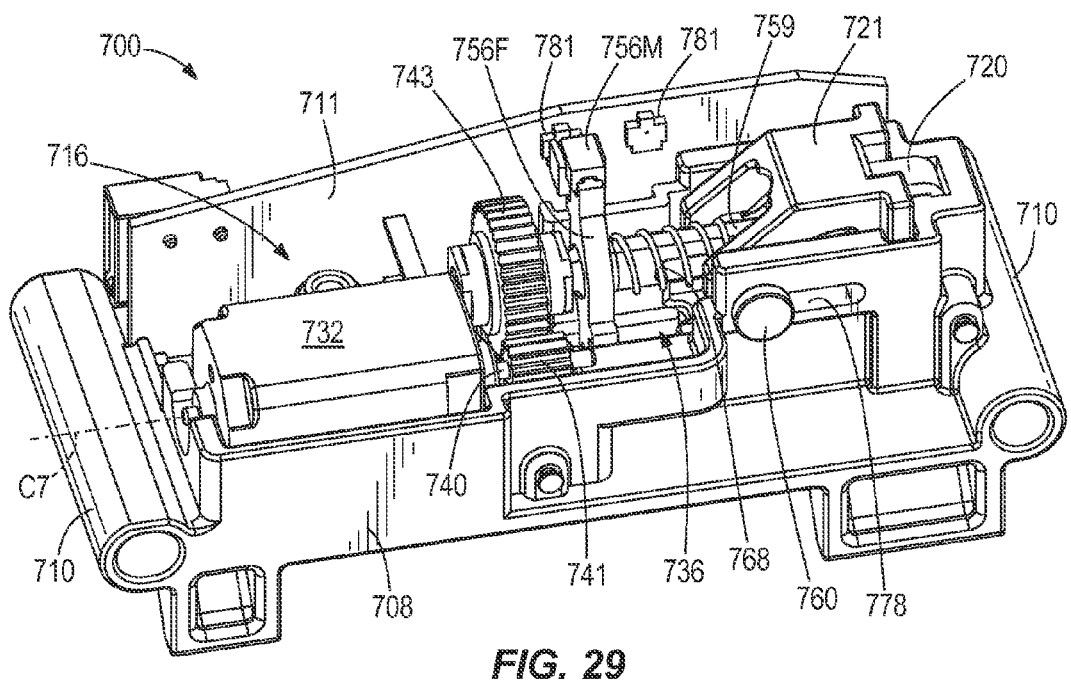
FIG. 29 is a perspective view identical to FIG. 28, but with the lockbolt in the unlocked state.
Figure 30:
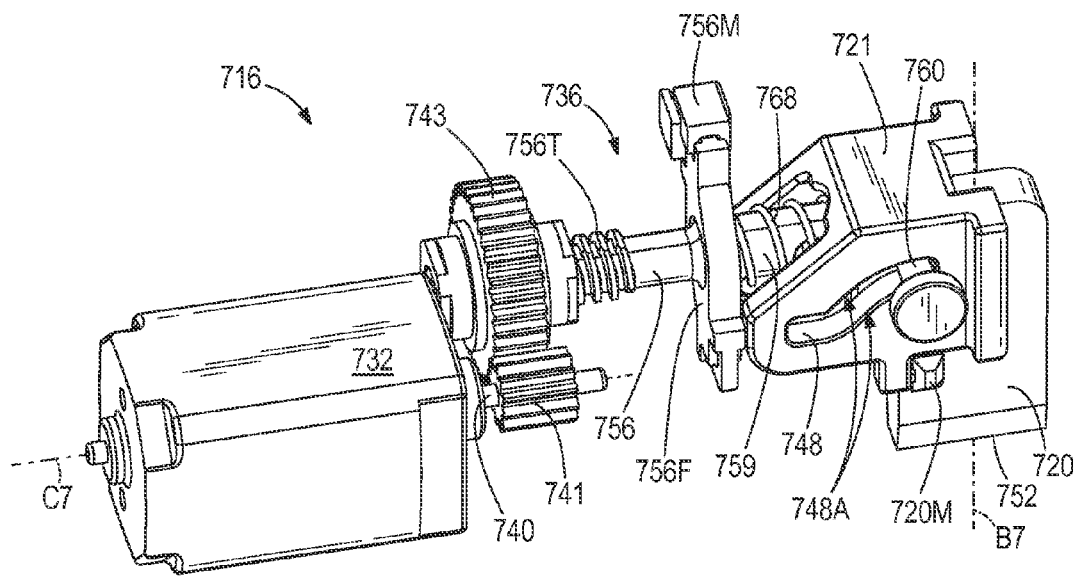
FIG. 30 is a perspective view of the actuation mechanism of the steering lock of FIGS. 25-29. The lockbolt is in the locked state, as in FIG. 28.
Figure 31:
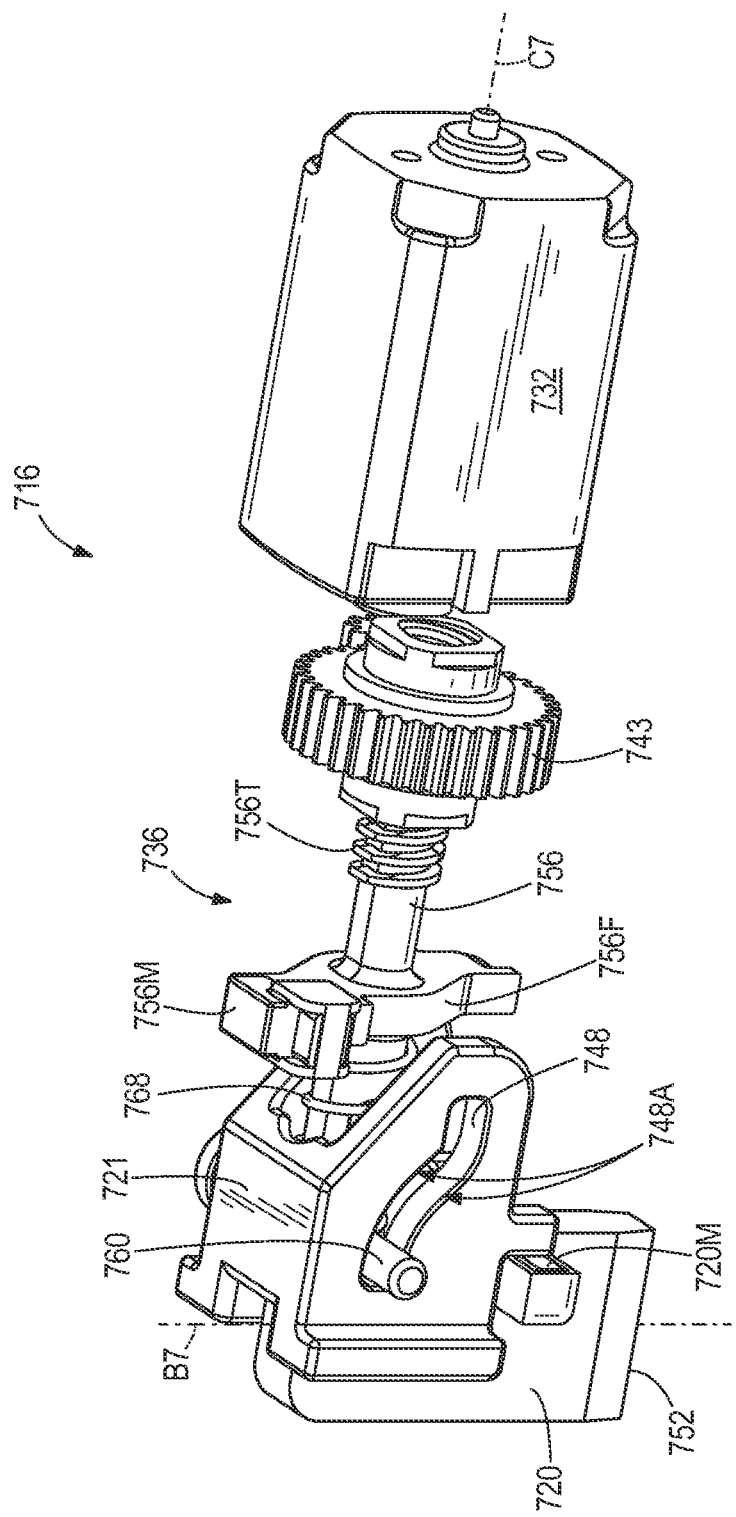
FIG. 31 is an alternate perspective view of the actuation mechanism of the steering lock of FIGS. 25-29. The lockbolt is in the locked state, as in FIGS. 28 and 30.
Figure 32:
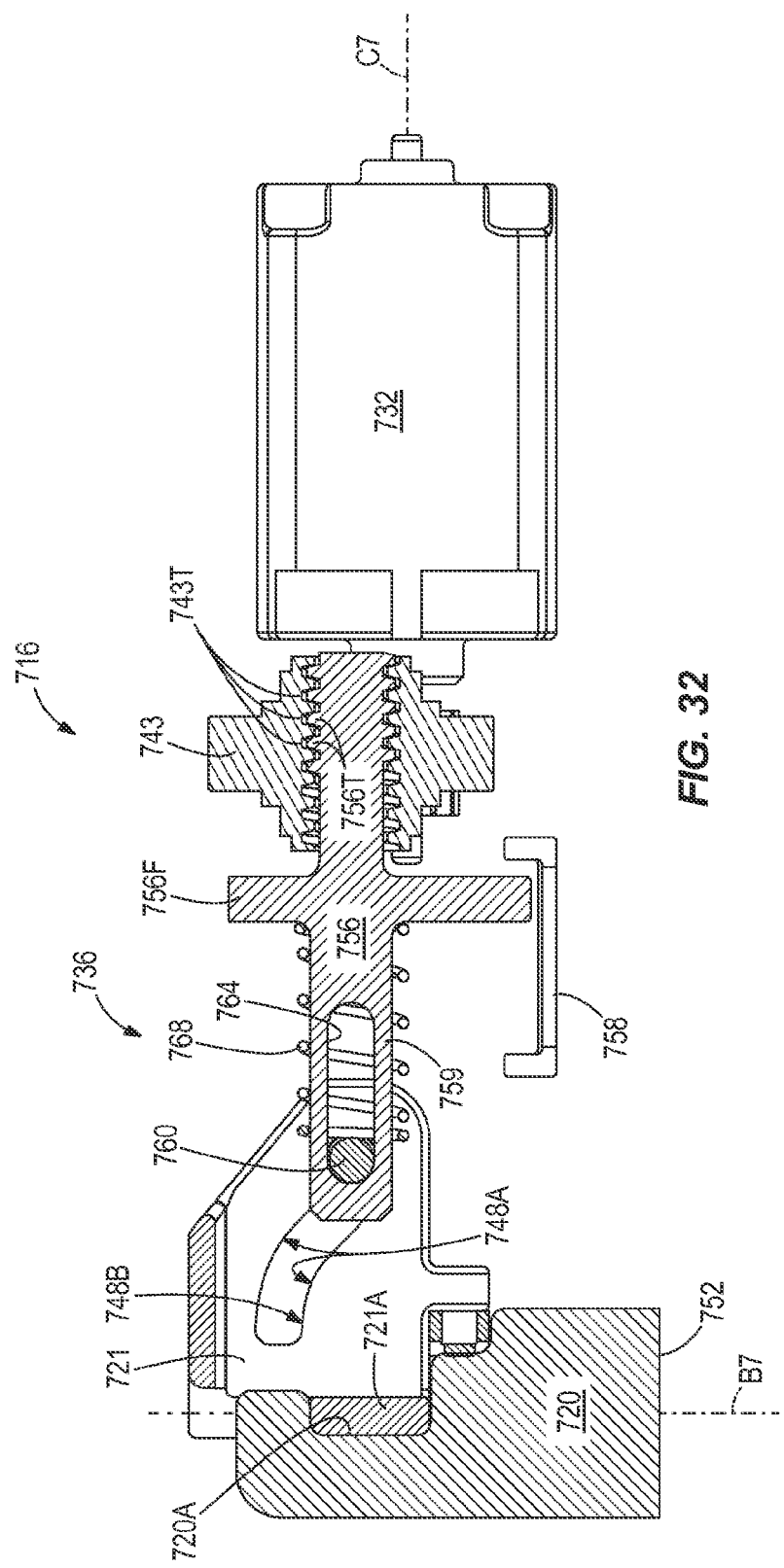
FIG. 32 is a cross-sectional view of the steering lock of FIGS. 25-29 in a state in which the lockbolt is in the unlocked state.
Figure 33:
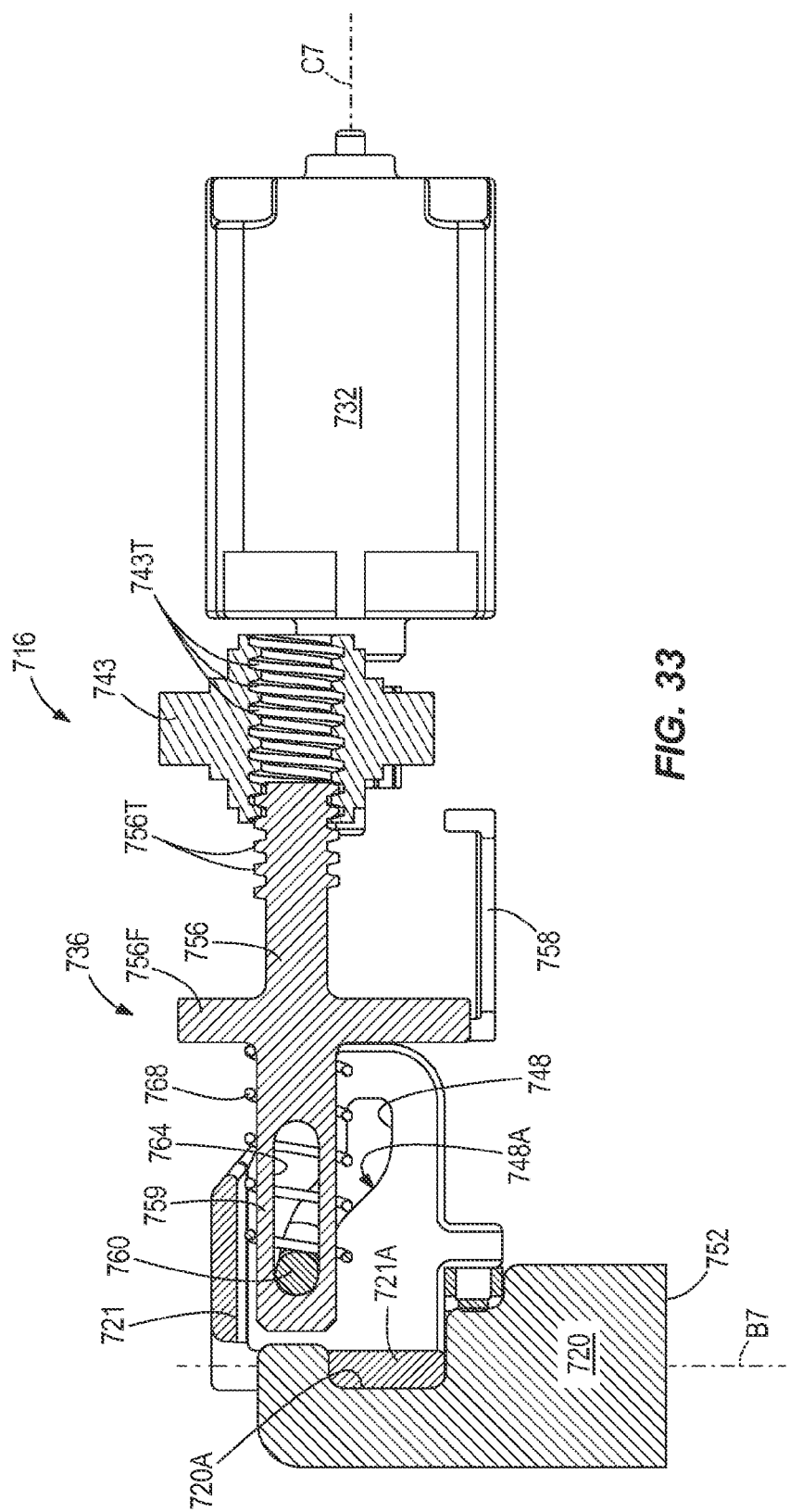
FIG. 33 is a cross-sectional view of the steering lock of FIGS. 25-29 in a state in which the lockbolt is in the locked state.

The steering lock 700 of FIG. 25 includes a housing 708 and a cover 712 which cooperates with the housing 708 to enclose an actuation device 716 for controlling the state of the lockbolt 720 for selectively locking a steering ring (not shown). The housing 708 includes mounting portions 710 at each of two opposing ends of the housing 708, one of which is adjacent the lockbolt 720 and the other of which is remote from the lockbolt 720. The two mounting portions 710 are provided as generally cylindrical or tubular formations that are parallel to one another, and each extend across substantially the entire width of the housing 708. The axes of both of the mounting portions 710 are substantially perpendicular to the lockbolt axis B7. One of the mounting portions 710 (left in FIGS. 26-29) may be slightly elongated in a direction perpendicular to its axis (and perpendicular to the lockbolt axis B7) to allow for tolerancing when mounting the steering lock 700 to adjacent structure within a vehicle.

The actuation device 716 includes an actuator 732, which can be similar in many aspects to the actuators described above. For example, the actuator 732 can be an electric motor having an output shaft 740 defining an axis C7. However, the actuator 732 of the steering lock 700 has a generally rectangular body shape having four generally flat sides. This can provide alternate mounting configurations and potentially quieter operation. A shuttle 736 having a similar function to the shuttles described above is drivable by the actuator 732 between blocking and non-blocking positions. In view of the above description, a detailed description of the operation of the actuation device 716 is not required for understanding, but it should be noted that the shuttle 736 drives the lockbolt 720 to the locked state by moving from the non-blocking position (retracted) to the blocking position (extended), and blocks the lockbolt 720 from moving to the unlocked state when in the blocking position. Thus, the steering lock 700 can passively but positively retain the lockbolt 720 in the locked state, and the lockbolt 720 can be unbiased along the axis B7. The shuttle 736 also stores energy upon actuation to the blocking position when the lockbolt 720 is aligned with a rib or projection of the steering ring. The shuttle 736 is driven by a parallel gear set including a first gear 741 on the output shaft 740 and a second gear 743, which is larger in diameter than the first gear 741. The first and second gears 740, 741 can be substantially enclosed by a sub-housing 746. The sub-housing 746 can include multiple pieces that fit together (e.g., snap-fit together) and generally conform to the shape of the first and second gears 741, 743. The sub-housing 746 can provide an additional sound containment structure within the housing 708 so that noise from operation of the gears 741, 743 as measured outside the housing 708 (e.g., within a vehicle cabin) is further reduced or eliminated.

The second gear 743 includes threads engaged with threads 756T of the guide body 756, so that the guide body 756 is moved axially when the second gear 743 is rotated in place. In the illustrated construction, the interior of the second gear 743 is provided with female threads and the threads 756T on the guide body 756 are external male threads, but other arrangements may be provided. Lost motion and energy storage are provided by the shuttle 736 when the shuttle 736 is actuated to the blocking position and the lockbolt 720 is aligned with a rib of the steering ring rather than a groove. The lost motion device includes a spring 768 positioned on a post portion 759 of the guide body 756, between a transverse flange portion 756F and a shaft 760. The shaft 760 is positioned within one or more cam slots 748 of the lockbolt carrier 721, and also within a slot 764 of the guide body 756. The outer portions of the shaft 760 are guided by slots 778 or other surfaces of the housing 708. The transverse flange 756F of the guide body 756 is also guided for linear movement within the housing 708. A resilient bumper 758 (FIGS. 32 and 33) may be provided within the housing 708 and configured to provide soft stops or limits to the motion of the guide body 756. As illustrated, the bumper 758 is a U-shaped member with two upstanding stops, one at either end. In other constructions, the bumper 758 can have other shapes, or individual bumpers are provided for the fore and aft stops.

A sensor magnet 756M is coupled to the guide body 756, and may be coupled to the transverse flange 756F. The magnet 756M can be held in a polymer body and snapped, clipped, threaded, bonded, or otherwise attached to the transverse flange 756F. In the illustrated construction, the magnet 756M is positioned on a lateral side of the transverse flange 756F to move along a magnetic switch formed by two magnetic sensors 781 on the PCB 711 positioned adjacent the actuation device 716. The magnetic sensors 781 can be configured to sense the two limit positions of the guide body 756 and provide feedback to a controller which controls operation of the actuator 732. An additional sensor may be provided to directly sense the position of the lockbolt 720. For example, another magnet 720M (FIGS. 30 and 31) may be coupled to the lockbolt 720 or the lockbolt carrier 721 for detection by a magnetic sensor (not shown) coupled to the PCB 711 adjacent the lockbolt 720.

Figure 34:
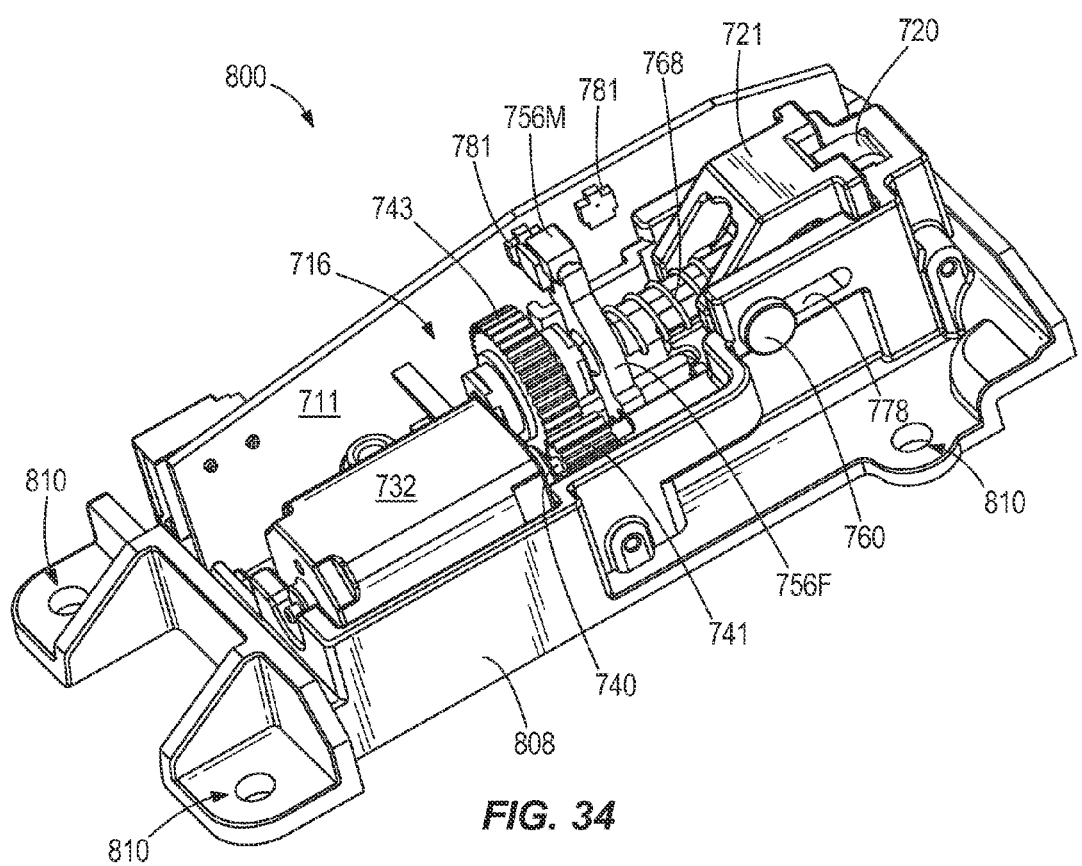
FIG. 34 is a perspective view of a steering lock and actuation mechanism similar to that of FIGS. 25-33, but having an alternate housing.

FIG. 34 illustrates a steering lock 800 similar to the steering lock 700 of FIGS. 25-33, and in fact features the same actuation device 716. However, the steering lock 800 of FIG. 34 includes a housing 808 having an alternate mounting interface than that of the housing 708. Instead of the cylindrical mounting portions 710 that extend substantially perpendicular to the lockbolt axis B7, the housing 808 includes a plurality of individual mounting portions 810 at each end, each provided as flanges with apertures that are substantially parallel with the lockbolt axis B7. The position and number of mounting portions 810 may vary with different applications for different vehicle packaging constraints. Although not shown, the steering lock 800 includes a cover similar to the cover 712 shown in FIGS. 25 and 26. Additional features and operation of the steering lock 800 are not described in detail herein as they will be understood from the preceding description.

What is claimed is:

1. A steering lock for selectively inhibiting rotation of a rotary steering member having a rib, the steering lock comprising:
    a lockbolt movable along a first axis between a steering member-locking position, in which a distal tip of the lockbolt is positioned in interference with the rib, and a steering member-unlocking position, in which the distal tip of the lockbolt is positioned out of interference with the rib;
    a shuttle movable between a non-blocking position, in which the shuttle does not obstruct movement of the lockbolt from the steering member-locking position to the steering member-unlocking position, and a blocking position, in which the shuttle obstructs movement of the lockbolt out of the steering member-locking position;
    an actuator coupled to the shuttle and operable to drive the lockbolt to the steering member-locking position by moving the shuttle from the non-blocking position to the blocking position; and
    wherein the lockbolt is unbiased along the first axis.

2. The steering lock of claim 1, further comprising a lost motion connection between the actuator and the lockbolt.

3. The steering lock of claim 2, wherein the lost motion connection includes a spring.

4. The steering lock of claim 2, wherein the lost motion connection is configured to store energy supplied from the actuator when the shuttle is moved from the non-blocking position to the blocking position while the rib is aligned with the first axis, wherein the lockbolt is movable to the steering member-locking position by the stored energy of the lost motion connection when the rib is moved away from the first axis.

5. The steering lock of claim 2, wherein the shuttle includes a first portion coupled to the lockbolt and a second portion coupled to the actuator, wherein the lost motion connection is provided between the first and second portions of the shuttle.

6. The steering lock of claim 5, wherein the first portion includes a roller unit configured to provide a rolling interface for driving the lockbolt to the steering member-locking position.

7. The steering lock of claim 6, further comprising a housing having a substantially flat guide surface for supporting the roller unit.

8. The steering lock of claim 5, wherein a first inclined cam surface is provided between the shuttle and the lockbolt so that substantially linear movement of the shuttle first portion in a first direction substantially perpendicular to the first axis is configured to move the lockbolt to the steering member-locking position.

9. The steering lock of claim 8, wherein a second inclined cam surface is provided between the shuttle and the lockbolt so that substantially linear movement of the shuttle first portion in a second direction substantially perpendicular to the first axis is configured to move the lockbolt to the steering member-unlocking position.

10. The steering lock of claim 2, wherein the shuttle includes a link that is coupled to the actuator through a crank, and the lost motion connection includes a biasing member positioned in an opening of the link.

11. The steering lock of claim 1, wherein the shuttle is movable along a path non-parallel to the first axis between the blocking and non-blocking positions.

12. The steering lock of claim 1, wherein the lockbolt is part of an integrally movable lockbolt unit that further includes a lockbolt carrier.

13. The steering lock of claim 12, wherein the shuttle shares a cam interface with the lockbolt carrier for moving the lockbolt to at least one of the steering member-locking position and the steering member-unlocking position.

14. The steering lock of claim 12, wherein the shuttle includes an axle supported by bearings for rolling, wherein the axle extends through a cam slot of the lockbolt carrier for moving the lockbolt bi-directionally between both of the steering member-locking position and the steering member-unlocking position in response to energization of the actuator.

15. The steering lock of claim 1, further comprising a housing, wherein the shuttle includes a link that is coupled to the actuator through a crank, the crank having a portion which interferes with the housing upon rotation of the crank past a top dead center position in a direction of crank rotation corresponding to actuation of the shuttle into the blocking position.

16. An actuation device for a steering lock which is operable to selectively inhibit rotation of a rotary steering member having a rib, the actuation device comprising:
a lockbolt movable along a first axis between a steering member-locking position and a steering member-unlocking position;
a shuttle movable between a non-blocking position, in which the shuttle does not obstruct movement of the lockbolt from the steering member-locking position to the steering member-unlocking position, and a blocking position, in which the shuttle obstructs movement of the lockbolt from the steering member-locking position to the steering member-unlocking position, wherein the shuttle defines a link; and
an actuator operatively coupled to the link via a crank and operable to move the shuttle from the non-blocking position to the blocking position by rotating the crank in a first locking direction, and to move the shuttle from the blocking position to the non-blocking position by rotating the crank in a second unlocking direction;
wherein the crank is configured to be rotated by the actuator in the first locking direction to drive the link past a maximum extent that defines a top-dead-center condition with respect to the crank when the shuttle is moved into the blocking position so that any backdriving force on the shuttle from the lockbolt can only further urge the crank in the first locking direction.

17. The actuation device of claim 16, wherein the shuttle is movable along a path non-parallel to the first axis between the blocking position and the non-blocking position.

18. The actuation device of claim 16, further comprising a lost motion connection between the actuator and the lockbolt, the lost motion connection having a biasing member configured to store energy supplied from the actuator when the shuttle is moved from the non-blocking position to the blocking position while the rib is aligned with the first axis, wherein the shuttle passing through and past the top-dead-center condition when moved into the blocking position ensures that any residual energy in the biasing member urges the crank in the first locking direction.

19. The steering lock of claim 18, wherein the biasing member includes a spring.

20. The steering lock of claim 18, wherein the shuttle includes a first portion coupled to the lockbolt and a second portion coupled to the actuator, wherein the lost motion connection is provided between the first and second portions of the shuttle.

21. The steering lock of claim 20, wherein the first portion includes a roller unit configured to provide a rolling interface for driving the lockbolt to the steering member-locking position.

22. The steering lock of claim 21, further comprising a housing having a substantially flat guide surface for supporting the roller unit.

23. The steering lock of claim 20, wherein a first inclined cam surface is provided between the shuttle and the lockbolt so that substantially linear movement of the shuttle first portion in a first direction substantially perpendicular to the first axis is configured to move the lockbolt to the steering member-locking position.

24. The steering lock of claim 23, wherein a second inclined cam surface is provided between the shuttle and the lockbolt so that substantially linear movement of the shuttle first portion in a second direction substantially perpendicular to the first axis is configured to move the lockbolt to the steering member-unlocking position.

25. The steering lock of claim 18, wherein the biasing member is positioned in an opening provided in the shuttle.

26. The steering lock of claim 16, wherein the lockbolt is unbiased along the first axis.

27. The steering lock of claim 16, wherein the lockbolt is part of an integrally movable lockbolt unit that further includes a lockbolt carrier.

28. The steering lock of claim 27, wherein the shuttle shares a cam interface with the lockbolt carrier for moving the lockbolt to at least one of the steering member-locking position and the steering member-unlocking position.

29. The steering lock of claim 27, wherein the shuttle includes an axle supported by bearings for rolling, wherein the axle extends through a cam slot of the lockbolt carrier for moving the lockbolt bi-directionally between both of the steering member-locking position and the steering member-unlocking position in response to energisation of the actuator.

30. The steering lock of claim 16, further comprising a housing, wherein the crank includes a portion which interferes with the housing upon rotation of the crank in the first locking direction past the top dead center condition from the blocking position.

* * * * *